United States Patent
Baker et al.

[19]

[11] Patent Number: 5,980,609
[45] Date of Patent: Nov. 9, 1999

[54] HYDROGEN RECOVERY PROCESS

[75] Inventors: Richard W. Baker, Palo Alto; Kaaeid A. Lokhandwala, Union City, both of Calif.

[73] Assignee: Membrane Technology and Research, Inc., Menlo Park, Calif.

[21] Appl. No.: 09/083,775

[22] Filed: May 22, 1998

Related U.S. Application Data

[63] Continuation-in-part of application No. 08/789,376, Jan. 24, 1997, Pat. No. 5,785,739, and a continuation-in-part of application No. 08/780,868, Jan. 24, 1997, Pat. No. 5,755,855.

[51] Int. Cl.$^6$ ..................................................... B01D 53/22
[52] U.S. Cl. .......................... 95/39; 95/41; 95/42; 95/50; 95/96; 95/149
[58] Field of Search .................................. 95/39, 45, 50, 95/41, 42, 90, 96, 143, 149, 237

[56] References Cited

U.S. PATENT DOCUMENTS

| | | | |
|---|---|---|---|
| 4,362,613 | 12/1982 | MacLean | 208/108 |
| 4,367,135 | 1/1983 | Posey, Jr. | 208/108 |
| 4,548,619 | 10/1985 | Steacy | 55/16 |
| 4,553,983 | 11/1985 | Baker | 62/18 |
| 4,654,063 | 3/1987 | Auvil et al. | 62/18 |
| 4,836,833 | 6/1989 | Nicholas et al. | 55/16 |
| 4,857,078 | 8/1989 | Walter | 55/16 |
| 4,892,564 | 1/1990 | Cooley | 55/16 |
| 4,906,256 | 3/1990 | Baker et al. | 55/16 |
| 4,963,165 | 10/1990 | Blume et al. | 55/16 |
| 4,994,094 | 2/1991 | Behling et al. | 55/16 |
| 5,032,148 | 7/1991 | Baker et al. | 55/16 |
| 5,053,067 | 10/1991 | Chretien | 62/24 |
| 5,069,686 | 12/1991 | Baker et al. | 55/16 |
| 5,082,481 | 1/1992 | Barchas et al. | 62/23 |
| 5,089,033 | 2/1992 | Wijmans | 55/16 |
| 5,127,926 | 7/1992 | Baker et al. | 55/16 |
| 5,157,200 | 10/1992 | Mikkinen et al. | 585/803 |
| 5,199,962 | 4/1993 | Wijmans | 55/16 |
| 5,205,843 | 4/1993 | Kaschemekat et al. | 55/16 |
| 5,281,255 | 1/1994 | Toy et al. | 95/50 |
| 5,332,424 | 7/1994 | Rao et al. | 95/47 |
| 5,354,547 | 10/1994 | Rao et al. | 423/650 |

(List continued on next page.)

OTHER PUBLICATIONS

H. Yamashiro et al., "Hydrogen Purification With Cellulose Acetate Membranes," presented at the Europe–Japan Congress on Membranes and Membrane Processes, Jun. 18–21, 1987.

W.A. Bollinger et al., "Prism™ Separators Optimize Hydrocracker Hydrogen," presented at AIChE 1983 Summer National Meeting, Session No. 66, Aug. 29, 1983.

H. Yamashiro et al., "Plant Uses Membrane Separation," Hydrocarbon Processing, Feb. 1985.

W.A. Bollinger et al., "Optimizing Hydrocracker Hydrogen," Chemical Engineering Progress, May 1984.

J.M. Abrado et al., "Hydrogen Technologies to Meet Refiners' Future Needs," Hydrocarbon Processing, Feb. 1985.

"Polymeric Gas Separation Membranes," Paul and Yampolski (eds.).

"Membrane Technology for Hydrocarbon Separation," Membrane Associates Ltd.

*Primary Examiner*—Robert H. Spitzer
*Attorney, Agent, or Firm*—J. Farrant

[57] ABSTRACT

A treatment process for a hydrogen-containing off-gas stream from a refinery, petrochemical plant or the like. The process includes three separation steps: condensation, membrane separation and hydrocarbon fraction separation. The membrane separation step is characterized in that it is carried out using a polymeric separation membrane that is selective in favor of hydrocarbons, including methane, over hydrogen, so that the hydrogen-enriched stream is delivered at high pressure.

24 Claims, 11 Drawing Sheets

U.S. PATENT DOCUMENTS

| | | | |
|---|---|---|---|
| 5,374,300 | 12/1994 | Kaschemekat et al. | 95/39 |
| 5,435,836 | 7/1995 | Anand et al. | 95/45 |
| 5,447,559 | 9/1995 | Air Poducts | 423/650 |
| 5,452,581 | 9/1995 | Dinh et al. | 62/24 |
| 5,501,722 | 3/1996 | Toy et al. | 95/50 |
| 5,507,856 | 4/1996 | Rao et al. | 95/50 |
| 5,634,354 | 6/1997 | Howard et al. | 62/624 |
| 5,669,958 | 9/1997 | Baker et al. | 95/50 |
| 5,689,032 | 11/1997 | Krause et al. | 585/802 |
| 5,755,855 | 5/1998 | Baker et al. | 95/39 |
| 5,762,685 | 6/1998 | Baker et al. | 95/39 |
| 5,769,927 | 6/1998 | Gottschlich et al. | 95/39 |
| 5,772,734 | 6/1998 | Baker et al. | 95/50 X |
| 5,785,739 | 7/1998 | Baker | 95/39 |
| 5,861,049 | 1/1999 | Lokhandwala | 95/39 |

HYDROGEN RECOVERY PROCESS

This application is a continuation-in-part of both Ser. No. 08/789,376, filed Jan. 24, 1997, now U.S. Pat. No. 5,785,739, and Ser. No. 08/780,868, filed Jan. 24, 1997, now U.S. Pat. No. 5,755,855, both of which are incorporated herein by reference in their entirety.

FIELD OF THE INVENTION

The invention relates to treatment of gas streams containing hydrogen and light hydrocarbons. In particular, the invention relates to treatment of such streams by means of a polymeric separation membrane.

BACKGROUND OF THE INVENTION

Many different streams containing mixtures of hydrogen and light hydrocarbons, such as $C_1$–$C_6$ hydrocarbons, are generated during oil refining and petrochemical manufacture.

Over the years, economic pressures have driven refiners to attempt to convert even the heaviest fraction of the crude oil to gasoline components, fuel oils and petrochemical feedstocks. For example, hydrocracking is widely used to break down aromatic cycle oils, coker distillates and other relatively heavy feeds and reconstitute them as diesel fuels, kerosene or naphtha. This process is a heavy consumer of hydrogen, using perhaps 1,000–2,000 scf/barrel of feedstock cracked, and yields streams from which it is very desirable to recover as much hydrogen as possible for reuse. Separation of the raw stream leaving the reactors is typically carried out by flashing off hydrogen, followed by various stripping and fractionation steps as appropriate. Nevertheless, considerable amounts of hydrogen are not recaptured and pass to the fuel gas line with unrecovered light hydrocarbons.

Likewise, demand for low-sulfur products has increased, and refineries are reaching or have reached the point at which they can consume more hydrogen in desulfurization and related hydrotreating than they can produce from catalytic reforming. For example, desulfurization of middle distillates typically consumes about 600 scf of hydrogen per barrel of treated feed; for vacuum gas oil this number rises to about 800 scf/bbl and for atmospheric residue to about 1,000 scf/bbl.

Other representative processes carried out in refineries or petrochemical plants that can give rise to streams containing some hydrogen include catalytic cracking, catalytic reforming, delayed coking, distillate dewaxing, aromatics production, alkylation, isomerization, hydrogenation and dehydrogenation, and olefin production. Hydrogen-containing streams also arise from unsaturated and saturated gas plants used to treat and fractionate pooled off-gases from the various unit operations.

These many sources give rise to diverse streams from which it is currently not cost effective to carry out further hydrogen recovery, and, in general, these gases are simply used as fuel within the plant. Yet these streams range in volume flow from less than 1 MMscfd up to 20 MMscfd or more, and contain from less than 1% hydrogen to more than 70% hydrogen. Furthermore, many streams also contain high percentages, such as 10%, 20%, 30% or more, of $C_{3+}$ hydrocarbons. The chemical value of these individual components is much higher—in some instances, as much as eight times higher—than their fuel value. The ability to recover at least some of this value would be advantageous, especially in refineries, which generally operate at narrow financial margins.

Separation of certain gas mixtures by means of selective membranes has been known to be possible for many years, and membrane-based gas separation systems are emerging to challenge conventional separations technology in a number of areas. That membranes have the potential to separate organic vapors from other gases is also known. For example, U.S. Pat. Nos. 4,553,983; 4,857,078; 4,963,165; 4,906,256; 4,994,094; 5,032,148; 5,069,686; 5,127,926; 5,281,255 and 5,501,722 all describe membranes, systems or processes suitable for such separations. Likewise, it has been recognized that condensation and membrane separation may be combined, as is shown in U.S. Pat. Nos. 5,089,033; 5,199,962; 5,205,843 and 5,374,300.

The use of certain polymeric membranes to treat off-gas streams in refineries is described in the following papers: "Hydrogen Purification with Cellulose Acetate Membranes", by H. Yamashiro et al., presented at the Europe-Japan Congress on Membranes and Membrane Processes, June 1984; "Prism™ Separators Optimize Hydrocracker Hydrogen", by W. A. Bollinger et al., presented at the AIChE 1983 Summer National Meeting, August 1983; "Plant Uses Membrane Separation", by H. Yamashiro et al., in Hydrocarbon Processing, February 1985;and "Optimizing Hydrocracker Hydrogen" by W. A. Bollinger et al., in Chemical Engineering Progress, May 1984. These papers describe system designs using cellulose acetate or similar membranes that permeate hydrogen and reject hydrocarbons. The use of membranes in refinery separations is also mentioned in "Hydrogen Technologies to Meet Refiners' Future Needs", by J. M. Abrardo et al. in Hydrocarbon Processing, February 1995. This paper points out the disadvantage of membranes, namely that they permeate the hydrogen, thereby delivering it at low pressure, and that they are susceptible to damage by hydrogen sulfide and heavy hydrocarbons.

A chapter in "Polymeric Gas Separation Membranes", D. R. Paul et al. (Eds.) entitled "Commercial and Practical Aspects of Gas Separation Membranes", by Jay Henis describes various hydrogen separations that can be performed with hydrogen-selective membranes.

Hydrogen recovery techniques including membrane separation for use in refinery operations are described in many patents. U.S. Pat. No. 4,362,613, to Monsanto, describes a process for treating the vapor phase from a high pressure separator in a hydrocracking plant by passing the vapor across a membrane that is selectively permeable to hydrogen. The process yields a hydrogen-enriched permeate that can be recompressed and recirculated to the hydrocracker reactor. U.S. Pat. No. 4,367,135, also to Monsanto, describes a process in which effluent from a low pressure separator is treated to recover hydrogen using the same type of hydrogen-selective membrane. U.S. Pat. No. 4,548,619, to UOP, shows membrane treatment of the overhead gas from an absorber treating effluent from benzene production. The membrane again permeates the hydrogen selectively and produces a hydrogen-enriched gas product that is withdrawn from the process. U.S. Pat. No. 5,053,067, to L'Air Liquide, discloses removal of part of the hydrogen from a refinery off-gas to change the dewpoint of the gas to facilitate downstream treatment. U.S. Pat. No. 5,082,481, to Lummus Crest, describes removal of carbon dioxide, hydrogen and water vapor from cracking effluent, the hydrogen separation being accomplished by a hydrogen-selective membrane. U.S. Pat. No. 5,157,200, to Institut Francais du Petrole, shows treatment of light ends containing hydrogen and light hydrocarbons, including using a hydrogen-selective membrane to separate hydrogen from other components. U.S.

Pat. No. 5,689,032, to Krause/Pasadyn, discusses a method for separating hydrogen and hydrocarbons from refinery off-gases, including multiple low-temperature condensation steps and a membrane separation step for hydrogen removal.

Literature from Membrane Associates Ltd., of Reading, England, shows and describes a design for pooling and downstream treating various refinery off-gases, including passing of the membrane permeate stream to subsequent treatment for LPG recovery.

Other references that describe membrane-based separation of hydrogen from gas streams in a general way include 4,654,063, 4,836,833, to Air Products, and 4,892,564, to Cooley.

U.S. Pat. No. 5,332,424, to Air Products, describes fractionation of a gas stream containing light hydrocarbons and hydrogen using an "adsorbent membrane". The membrane is made of carbon, and selectively adsorbs hydrocarbons onto the carbon surface, allowing separation between various hydrocarbon fractions to be made. Hydrogen tends to be retained in the membrane residue stream. Other Air Products patents that show application of carbon adsorbent membranes to hydrogen/hydrocarbon separations include U.S. Pat. Nos. 5,354,547; 5,435,836; 5,447,559 and 5,507,856, which all relate to purification of streams from steam reformers. U.S. Pat. No. 5,634,354, to Air Products, discloses removal of hydrogen from hydrogen/olefin streams. In this case, the membrane used to perform the separation is either a polymeric membrane selective for hydrogen over hydrocarbons or a carbon adsorbent membrane selective for hydrocarbons over hydrogen.

U.S. Pat. No. 4,857,078, to Watler, mentions that, in natural gas liquids recovery, streams that are enriched in hydrogen can be produced as retentate by a rubbery membrane.

A reference that shows condensation to remove hydrocarbons upstream of a membrane separation step in a refinery is U.S. Pat. No. 5,452,581, to Dinh et al. Effluent from an ethylene manufacturing operation is cooled to a temperature below 0° C., such as −30° C. to −50° C., before passing the remaining stream to a hydrogen-selective membrane. Interestingly, in this case, the membrane is specifically used to raise the dewpoint of the remaining stream to facilitate subsequent cryogenic condensation.

SUMMARY OF THE INVENTION

The invention is a process adapted for treating an off-gas stream from a refinery, petrochemical plant, natural gas processing plant, or similar facility. A principal goal of the process is to produce an upgraded hydrogen product stream from a gas stream containing a mixture of at least hydrogen and light hydrocarbons. The invention includes three separation steps: condensation, membrane separation and hydrocarbon fraction separation.

In a basic embodiment, the process of the invention includes the following steps:
(a) cooling the off-gas stream, resulting in partial condensation of the stream, thereby dividing the stream into a condensed portion enriched in hydrocarbons and an uncondensed portion enriched in hydrogen;
(b) treating the uncondensed portion in a membrane separation unit, to create a more hydrogen-enriched residue product stream and a hydrocarbon-enriched permeate stream;
(c) passing the condensed portion to a hydrocarbon fraction separation step for separation of a $C_{3+}$ hydrocarbon fraction and a lighter hydrocarbon fraction from the condensed portion;
(d) optionally recirculating the hydrocarbon-enriched stream and the lighter hydrocarbon fraction to the condensation step.

The membrane separation step is characterized in that it is carried out using a polymeric separation membrane that is selective in favor of hydrocarbons, including methane, over hydrogen.

To applicants' knowledge, such an integrated combination of steps has not previously been used for this type of separation.

The condensation step is most preferably carried out at a pressure no greater than about 500 psig and a temperature no lower than about −40° C.

The hydrocarbon fraction separation step can be carried out by flashing, distillation, or any other suitable technique.

All of the unit separation operations may be performed as single-stage operations, or may be themselves carried out in multiple sub-steps. It is also possible to carry out an additional condensation step on the $C_{3+}$ hydrocarbon-enriched membrane permeate stream, or to carry out the membrane separation step upstream of the condensation step, so that the condensation step is performed on the membrane permeate stream.

When operated with both the hydrocarbon-enriched stream and the lighter hydrocarbon fraction recirculated within the process, no secondary streams are produced. In this case, the process produces only two streams: an essentially hydrogen-free $C_{3+}$ hydrocarbon stream, which may be subjected to further distillation or other treatment to separate the hydrocarbons from one another as needed, and a hydrogen stream, which may be used immediately or after further purification as a hydrogen source within the facility.

Alternatively, the lighter $C_1$ and $C_2$ hydrocarbon fraction from the hydrocarbon fraction separation step may be removed as a separate stream from the process. This light stream, which has, compared to the original off-gas stream, a low content of each of hydrogen and the heavier hydrocarbons, can optionally be used as fuel in the facility. Thus, treatment of the off-gas stream in accordance with the invention retrieves quantities of hydrogen and $C_{3+}$ hydrocarbons as feedstocks, rather than consigning them to a low-value use as part of a fuel stream.

Our process has an important advantage over other membrane separation processes that have been used in the industry in the past: the membranes are hydrogen-rejecting. That is, all of the hydrocarbon components, including the methane, permeate the membrane preferentially, leaving a residue stream on the feed side that is concentrated in the slower-permeating hydrogen. This means that the hydrogen product stream is delivered at high pressure. Since one goal of the separation is often to create a source of hydrogen for reuse in the plant, the ability to deliver this hydrogen without the need for recompression is attractive.

Also as a result of the preferential hydrocarbon permeation, the membrane separation step can produce streams that are significantly colder, such as 10° C., 20° C. or more colder, than the membrane feed stream. These streams can be used to provide cooling for the condensation step. In another aspect, therefore, the invention includes heat integration steps that can, in favorable cases, provide all or most of the cooling capacity required for condensation.

Since polymeric materials are used for the membranes, they are relatively easy and inexpensive to prepare and to house in modules, compared with other types of hydrogen-rejecting membranes, such as finely microporous inorganic membranes, including adsorbent carbon membranes, pyrolysed carbon membranes and ceramic membranes.

The membranes used in the present invention permeate heavier hydrocarbons and hydrogen sulfide and are capable of withstanding exposure to these materials even in comparatively high concentrations. This contrasts with cellulose acetate and like membranes, which must be protected from exposure to heavy hydrocarbons.

Specific exemplary separations to which the process of the invention can be applied include, but are not limited to, separation of light hydrocarbons from hydrogen in off-gas streams from: hydrocrackers; hydrotreaters of various kinds, including hydrodesulfirization units; catalytic crackers; coking reactors; catalytic reformers; specific isomerization, alkylation and dealkylation units; steam reformers; hydrogenation and dehydrogenation processes; and steam crackers for olefin production.

It is to be understood that the above summary and the following detailed description are intended to explain and illustrate the invention without restricting its scope.

DETAILED DESCRIPTION OF THE INVENTION

Figure 1:
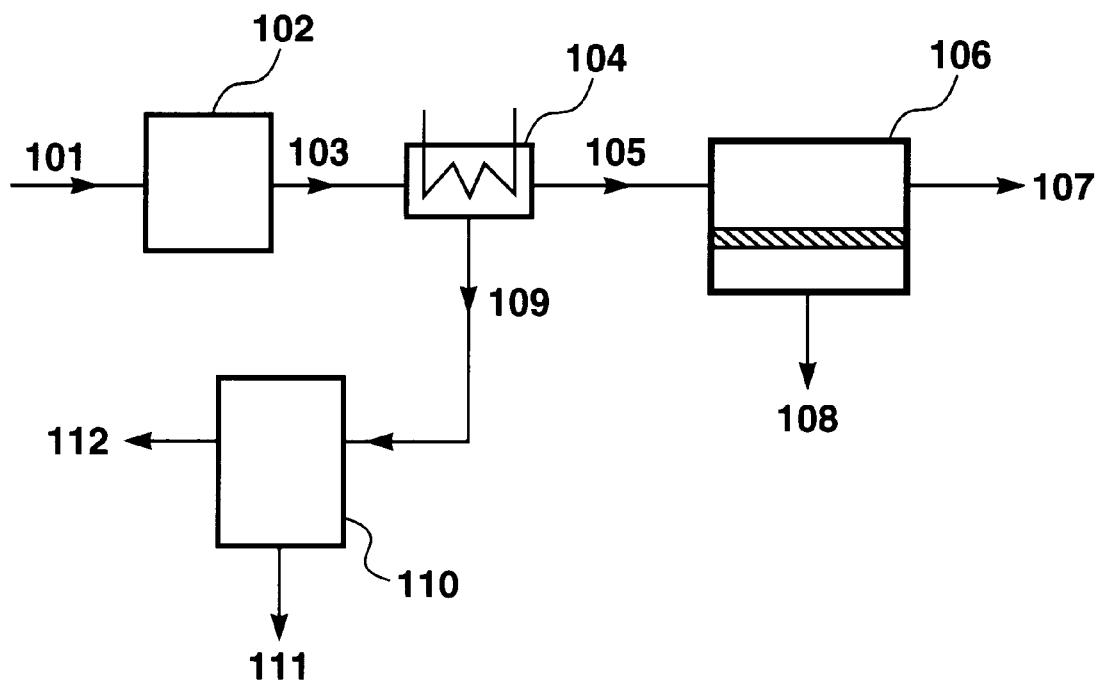
FIG. 1 is a schematic drawing showing a basic embodiment of the invention.

The term gas as used herein means a gas or a vapor.

The term $C_{2+}$ hydrocarbon means a hydrocarbon having at least two carbon atoms; the term $C_{3+}$ hydrocarbon means a hydrocarbon having at least three carbon atoms; and so on. The term $C_{2-}$ hydrocarbon means a hydrocarbon having no more than two carbon atoms; the term $C_{3-}$ hydrocarbon means a hydrocarbon having no more than three carbon atoms; and so on.

The term light hydrocarbon means a hydrocarbon molecule having no more than about six carbon atoms.

The term lighter hydrocarbons means $C_1$ or $C_2$ hydrocarbons.

The term heavier hydrocarbons means $C_{3+}$ hydrocarbons.

The terms two-step and multi step as used herein mean an arrangement of membrane modules or banks of membrane modules connected together such that the residue stream from one module or bank of modules becomes the feedstream for the next.

The terms two-stage and multistage as used herein mean an arrangement of membrane modules or banks of membrane modules connected together such that the permeate stream from one module or bank of modules becomes the feedstream for the next.

The term membrane array means a set of membrane modules or banks of modules connected in a multi step arrangement, multistage arrangement, or mixtures or combinations of these.

The term product residue stream means the residue stream exiting a membrane array when the membrane separation process is complete. This stream may be derived from one membrane bank, or may be the pooled residue streams from several membrane banks.

The term product permeate stream means the permeate stream exiting a membrane array when the membrane separation process is complete. This stream may be derived from one membrane bank, or may be the pooled permeate streams from several membrane banks.

The term off-gas stream means a stream leaving an operation or set of operations in a refinery, petrochemical plant, natural gas processing plant, or any other facility producing mixtures of hydrogen and light hydrocarbons. An off-gas stream may be an intermediate stream that is passing from one processing step to another in the facility. Examples include streams from desulfirization steps that will be passed to reformers or catalytic crackers, or gas streams that will be passed to the unsaturated or saturated gas plants. An off-gas stream may also be a waste gas stream that is to be used as fuel or discharged. Examples include overhead streams from various columns in the saturated and unsaturated gas plants, from other distillation columns, and from strippers and splitters. Petrochemical off-gases include, for example, those generated by the production of butadiene by the Houdry process, production of ethanol from methanol, production of benzene from toluene, and production of styrene from ethylbenzene.

Percentages herein are by volume unless otherwise stated.

The invention is a process for treating an off-gas stream as defined above. One goal of the process is to produce an upgraded hydrogen product stream from a gas stream containing a mixture of at least hydrogen and light hydrocarbons. A second goal is to produce a useful $C_{3+}$ hydrocarbon stream. A third goal is to reduce the amounts of hydrogen and $C_{3+}$ hydrocarbons sent to the fuel gas line.

Frequently, the process of the invention will result in three streams: a hydrogen product stream, a $C_{3+}$ hydrocarbons stream, also known as NGL (natural gas liquids), and a methane/ethane stream, which may be used for fuel.

The invention includes three separation steps: condensation, membrane separation and hydrocarbon fraction separation. The process is shown in a typical basic embodiment in FIG. 1. Turning now to this figure, hydrocarbon stream, 101, is subjected to any operation, indicated by box 102, that produces an off-gas stream 103, that contains hydrogen and multiple light hydrocarbons, such as a mixture of $C_1$–$C_6$ hydrocarbons. The operation indicated by box 102 may be hydrotreating, catalytic reforming, catalytic cracking, hydrocracking, etc., or combinations of unit operations, identified more specifically below. Stream 103 passes through heat exchanger or chiller, 104, resulting in formation of a condensed stream, 109, containing hydrocarbons, but also containing some dissolved hydrogen, and an uncondensed stream, 105, still containing some uncondensed hydrocarbons.

The condensed stream or condensate, 109, then passes to hydrocarbon fraction separation step 110, which can be carried out by flashing or distilling the condensate, for example. This step produces a light overhead fraction 112, containing mostly methane, ethane and any remaining hydrogen, and a liquid fraction 111, containing mostly $C_{3+}$ hydrocarbons.

The uncondensed stream, 105, is fed to a membrane separation unit, 106. The membrane unit contains a hydrogen-rejecting membrane, that is a membrane that is selective for the hydrocarbons over hydrogen. Frequently, a pressure difference between the feed and permeate sides of the membrane large enough to provide sufficient driving force for transmembrane permeation may be provided because operation 102 produces an off-gas stream at high pressure compared to atmospheric, such as 100 psig, 200 psig, 300 psig or more. If the off-gas stream is not at sufficient pressure, additional driving force can be provided by compressing stream 103 or by connecting a vacuum pump on the permeate side of the membrane, so that permeate stream 108 is under partial vacuum. The membrane unit produces two streams, a residue stream, 107, and a permeate stream, 108. The residue stream, 107, is the hydrogen product stream. This stream can optionally be subjected to a further separation step, such as pressure swing adsorption (PSA) to recover a higher purity hydrogen product. After further purification, if necessary, the hydrogen product stream can be used as a feedstock in the facility or for other purposes as desired.

The permeate stream, 108, which is enriched in hydrocarbon content compared with membrane feed stream, 105, can be recirculated within the process of the invention, used or treated within the facility, or sent elsewhere for further treatment or use.

Each of the steps is now discussed in more detail.

The goal of the condensation step is to bring the off-gas stream to a pressure/temperature condition beyond the dewpoint of one or more of the hydrocarbons in the mixture, so that at least a portion of the hydrocarbons condenses out of the gas stream in liquid form. The amount of hydrocarbons that can be removed from the gas stream in this way will depend on the boiling points, the concentration in the feed, and the operating conditions under which the condensation is performed.

The condensation step involves chilling alone or, commonly, compression and chilling. Compressing the gas raises the dewpoint temperature, so a combination of compression and chilling is generally preferred. In some cases, operation 102 may be such that stream 103 is already at high pressure, such as above 100 or 200 psig for example. In this case, chilling alone may suffice to induce condensation.

It is desirable to avoid very high pressures and very low temperatures, since reaching these conditions adds to the cost and complexity of the process. By very high pressures, we mean pressures in excess of about 1,000 psig, or about 60 atm. The pressure at which the condensation step is operated should preferably be in the range below about 1,000 psig, more preferably below about 500 psig, and most preferably below about 250 psig.

By very low temperatures, we mean temperatures below about −100° C. The temperature at which the condensation step is operated should be above −100° C., preferably above about −40° C., more preferably above about −20° C., and most preferably above 0° C. Temperatures down to about the bottom of the preferred ranges should be possible to reach by single-stage refrigeration, for example using propylene as the cooling refrigerant. Cost savings can often be achieved by cooling in stages. As a purely representative example, a fan cooler may be employed to reduce the incoming stream temperature to 30–40° C., followed by heat exchange against chilled plant water to lower the temperature to 10–15° C., and finally heat exchange against the membrane permeate stream to reach 5° C. The temperature at which the condensation step functions is typically much higher than could be used for recovery by compression/condensation alone. For example, as shown in the Examples section below, good recovery of even ethylene may be had at temperatures above 0° C. This is a significant operational advantage, in that predrying the feed stream to avoid ice formation in the condenser is not necessary.

The fraction of hydrocarbons remaining in the condenser vent gas after the condensation step depends on the vapor/liquid equilibrium at the operating conditions under which the condensation step is performed. Since the boiling point of, for example, ethylene at 1 atm pressure is about −104° C., staying within the confines of the preferred ranges stated above would be difficult, or impossible, if good separation of hydrocarbons were to be accomplished by condensation alone. However, since the process of the invention does not rely on condensation alone, useful levels of separation can be achieved under the above-defined modest temperature and pressure conditions. For example, suppose the condensation step removes only 50% of the $C_{3+}$ hydrocarbon content of the feed gas. If the condensation step is followed by a membrane separation step that can remove 80% of the hydrocarbon reaching it, then the total removal obtained is 90%. If the condensation step removes 80%, and is followed by a membrane separation step that also removes 80%, then the total removal is 96%. If the condensation step removes 80% and the membrane separation step 90%, the total removal is 98%.

In the practice of the invention, therefore, it is preferable only that the condensation step be designed to remove at least about 50% of the $C_{3+}$ hydrocarbon content present in the feed to the condenser, more preferably, at least about 70%. Operation under extreme conditions to achieve 90% or more removal during condensation is unnecessary, because the process does not rely on condensation alone to achieve the overall separation.

The most preferred goal of the process is to separate two useful product streams from the off-gas stream: the hydrogen gas stream exiting as the high-pressure residue from the membrane separation step and the $C_{3+}$ hydrocarbon stream exiting as the bottom stream from the hydrocarbon fraction separation step. Typically, there will be composition targets for each stream. For example, the hydrogen stream might be required to contain no more than 40%, 30%, 20%, 10%, 5% or less total hydrocarbons, depending on its destination, and the hydrocarbon product stream 111 might be required to contain no more than 5%, 1% or less of hydrogen, and/or of the $C_1$ and $C_2$ hydrocarbons. Depending on the original composition of the mixture, this may mean 50%, 80%, 90% or 99%, for example, removal of hydrogen from hydrocarbons, or vice versa, coupled with 5-fold, 10-fold, 100-fold or 1,000-fold enrichment of the other stream.

If the condensation step necessitates cooling to below 0° C., and the gas stream contains water vapor, two chillers in series may optionally be used. The first chiller is maintained at a temperature close to 0° C., and removes most of the entrained water. The second chiller is maintained at the lower temperature necessary to remove a substantial fraction of the higher-boiling components. Some water vapor will inevitably pass into the second chiller but the use of the first chiller will significantly reduce the need for defrosting the second. Alternatively, the condensation step may include another type of dehydration process through which the gas stream passes before it enters the condenser.

For simplicity, the condenser or chiller in FIG. 1 is identified by a single box, 104, from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams. The same comment applies to the other figures herein.

Figure 5:
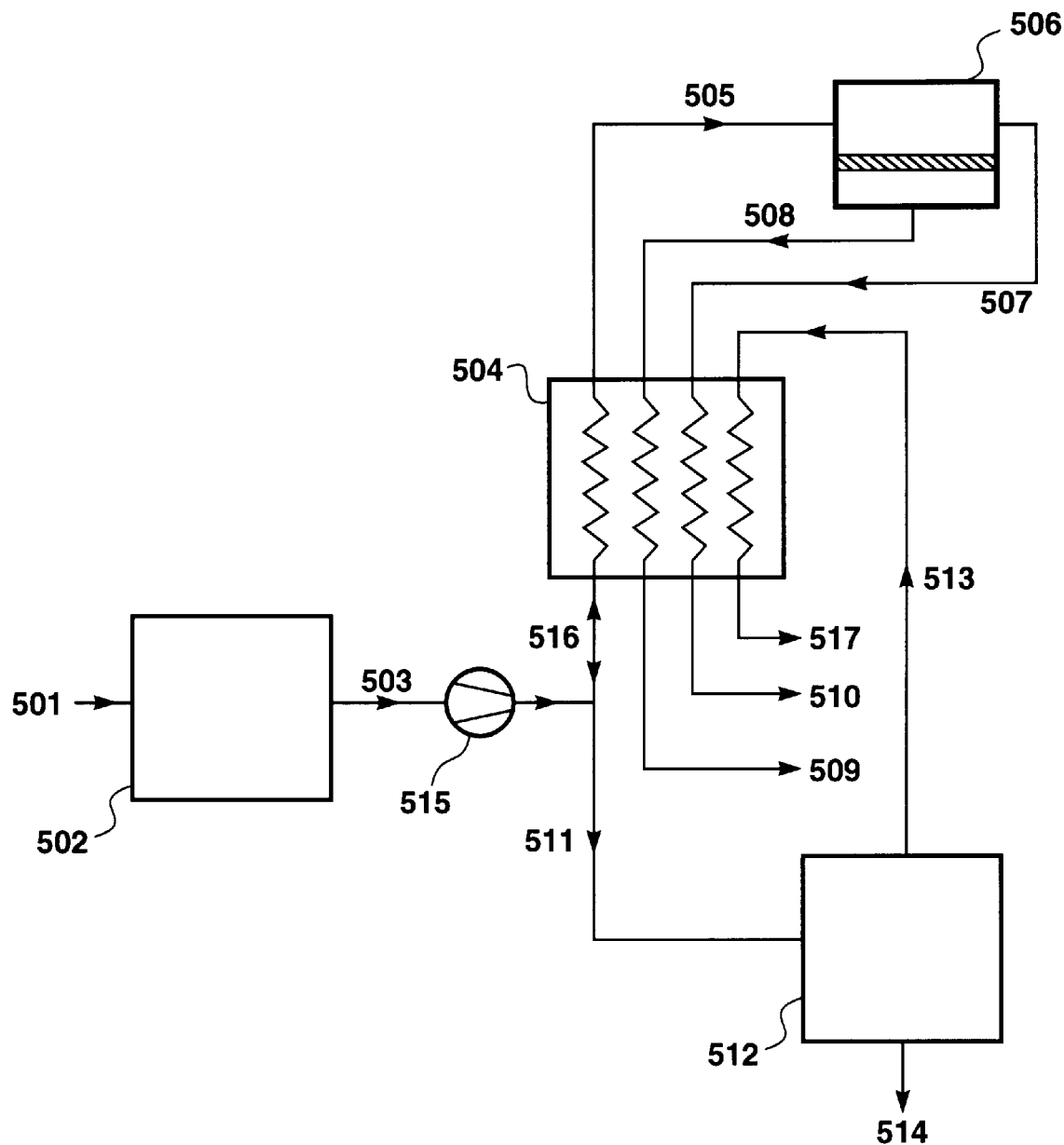
FIG. 5 is a schematic drawing showing an embodiment of the invention in which the hydrocarbon condensation step is carried out in a dephlegmator.

As an alternative to simple condensation, the condensation step may be carried out by means of a dephlegmator, that is a rectifying heat exchanger, as is shown in FIG. 5 and discussed in more detail below.

Turning now to the hydrocarbon fraction separation step, this may be carried out by any appropriate technique. Preferred techniques are flash evaporation and distillation. Typically, flashing is achieved by letting down the pressure of the liquid to be flashed, thereby achieving essentially instantaneous conversion of a portion of the liquid to the gas phase. This may be done by passing the liquid through an expansion valve into a receiving tank or chamber, or any other type of phase separation vessel, for example. The released gas can be drawn off from the upper part of the chamber; the remaining liquid can be withdrawn from the bottom. We prefer to carry out the flash evaporation by pressure release alone, since this is simple and convenient. We believe, also, that in general better removal of the lower-boiling gases is usually obtainable per unit pressure change than per unit temperature change.

Alternatively, flash evaporation can be achieved by sending the liquid to a vessel and raising the temperature, while maintaining the pressure at its previous value, or by a combination of pressure lowering and heating. Those of skill in the art will appreciate that the decision as to which method to use in any specific set of circumstances should be determined taking into account the environment in which the process is to be carried out, and the relative importance of product purity, operating costs and other factors.

During the flash step, it is preferred to bring the condensate to a condition a little above the saturation vapor pressure of the $C_2$ hydrocarbons at that temperature. This controls loss of $C_{2+}$ hydrocarbons into the gas phase. By a little above the saturation vapor pressure, we mean most preferably about 0–50 psig above the saturation vapor pressure at the flashing temperature. The amounts and compositions of the flashed gas and the product liquid depend on the changes of pressure and temperature to which the condensate is subjected. Generally, the results are very close to a theoretical one-stage evaporation step and can be calculated to good reliability from tabulated thermodynamic data. The energy taken to evaporate the flash gas results in a significant lowering of the temperature of the remaining liquid, such as 10° C., 20° C. or more. If desired, this liquid may be used to cool the incoming stream, such as by running against the incoming stream in heat exchanger or chiller, 104. However, this will necessitate lowering the pressure of the stream, which is often required at high pressure for subsequent fractionation operations, so is not preferred.

Optionally, flashing may be carried out in two or more stages, such as by lowering the pressure incrementally. This type of operation produces several gas streams at different pressures. By removing at least a portion of the gas at high pressure, the cost of compression of the remainder is reduced.

Depending on the environment in which the process is operating and the destinations of the hydrocarbons, it can be preferred to perform the hydrocarbon fraction separation step by distillation to remove the $C_1$ and $C_2$ components from the $C_{3+}$ fraction as an overhead product. For example, in many refinery operations, it is desirable to send the $C_{2-}$ components to the fuel gas line and retain the $C_{3+}$ components as a condensed liquid. A deethanizer column, as is well known in the art, can then be used to fractionate the condensate to achieve this result. In some cases, such as in treating off-gas from fluid catalytic cracking (FCC) or delayed coking, the gas can contain significant amounts of low molecular weight olefins, typically ethylene and propylene, which it is desired to separate from the light paraffins. For this application, it is often preferable to perform the hydrocarbon fraction separation step by feeding stream 109 first to a demethanizer column, as is well known in the art, so that overhead stream 112 contains methane and hydrogen, and bottom stream 111 contains the $C_{2+}$ fraction, then treating stream 111 to separate the $C_2$ and $C_3$ fractions and/or the olefins from the paraffins.

Figure 2:
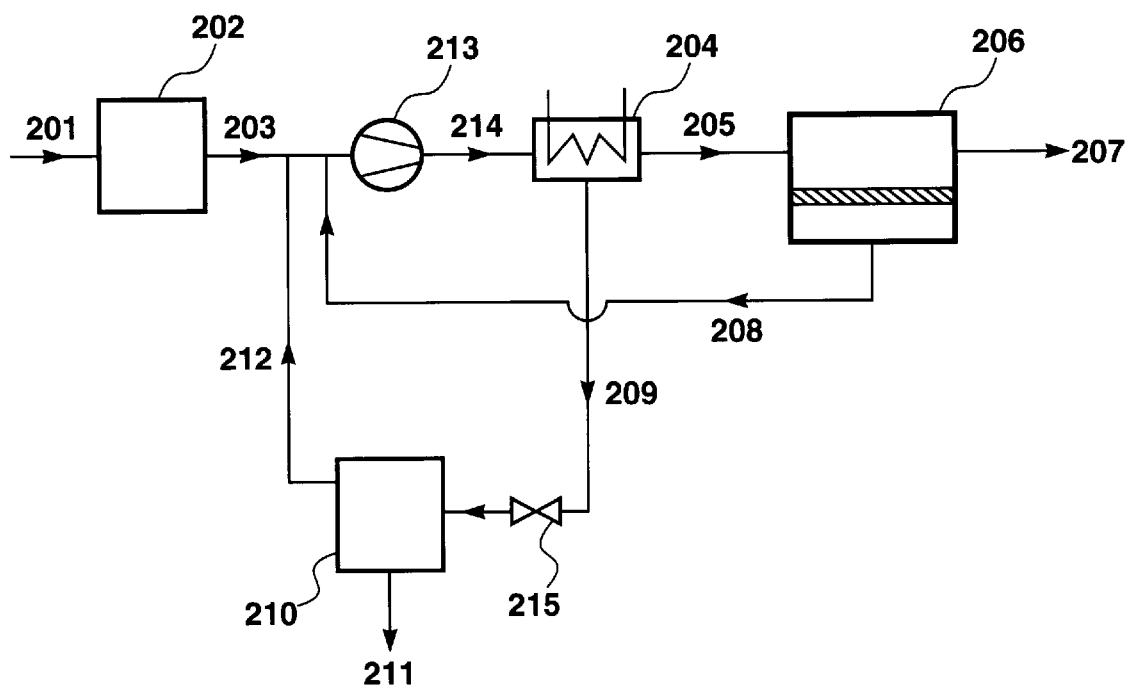
FIG. 2 is a schematic drawing showing an embodiment of the invention in which intermediate streams are recycled within the process.
Figure 4:
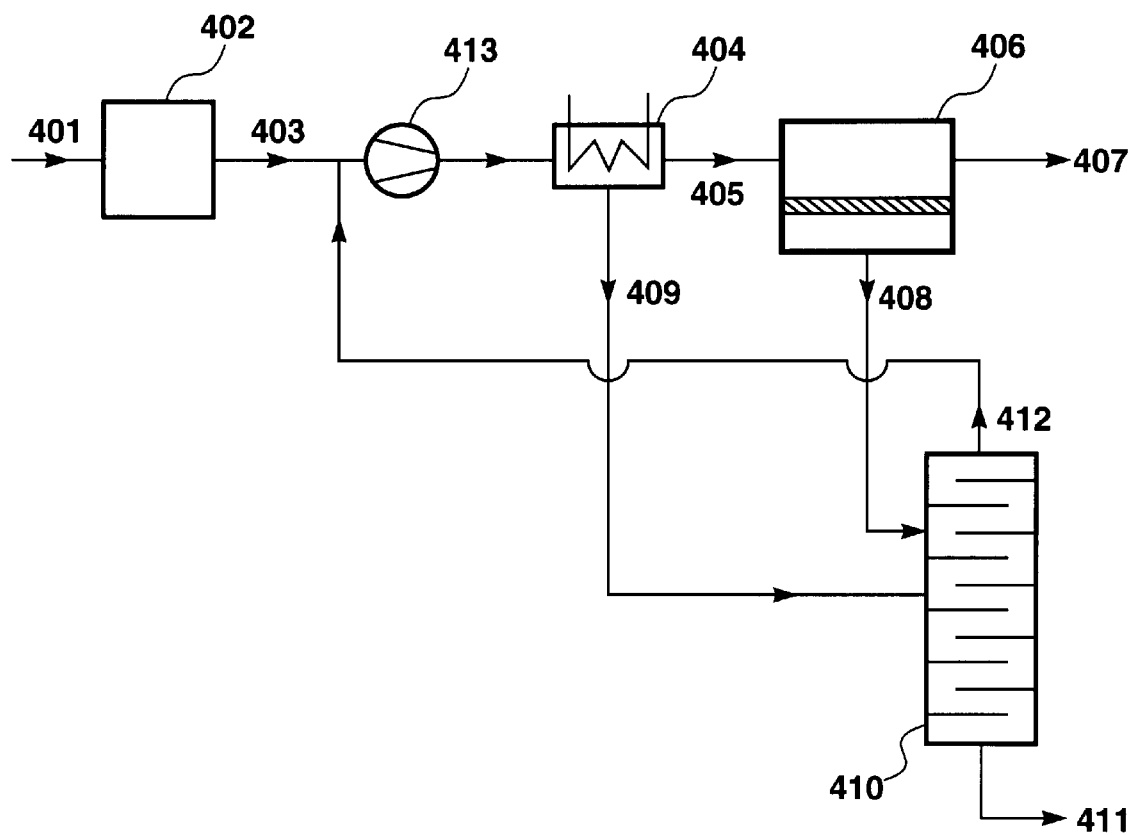
FIG. 4 is a schematic drawing showing an embodiment of the invention in which the permeate stream is passed to the hydrocarbon separation step and the overhead stream from the hydrocarbon separation step is recycled to the condensation step.

No specific destination for the overhead gas stream, 112, is indicated in FIG. 1, and the invention encompasses both embodiments in which this gas is recirculated within the process and embodiments in which it is not. Although it will be desirable in some cases to recirculate this stream, such as is shown in FIGS. 2 and 4, for example, discussed in more detail below, another destination for the gas is often preferred in the present invention. Recirculation of the lighter hydrocarbons means that they will tend to exit the process with the hydrogen stream, 107, resulting in a lower concentration of hydrogen in this stream. If the goal is to use the hydrogen residue stream directly from the process without further purification, this dilution of the hydrogen stream can be disadvantageous. In many embodiments of the invention, therefore, stream 112 will pass to the fuel gas line, or otherwise out of the process as a discrete stream.

The third unit separation process is membrane separation. The membrane unit contains a membrane that exhibits a substantially different permeability for hydrocarbons than for hydrogen.

The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{2+}$ organic molecules. For rubbery or elastomeric polymers, the difference in size is much less critical, because the polymer chains can be flexed, and sorption effects generally dominate the permeability. Elastomeric materials, therefore, tend to permeate large, condensable molecules faster than small, low-boiling molecules. Thus, most rubbery materials are selective in favor of all $C_{3+}$ hydrocarbons over hydrogen. However, for the smallest, least condensable hydrocarbons, methane in particular, even rubbery polymers tend to be selective in favor of hydrogen, because of the relative ease with which the hydrogen molecule can diffuse through most materials. For example, neoprene rubber has a selectivity for hydrogen over methane of about 4, natural rubber a selectivity for hydrogen over methane of about 1.6, and Kraton, a commercial polystyrene-butadiene copolymer, has a selectivity for hydrogen over methane of about 2.

Any rubbery material that is selective for $C_{2+}$ hydrocarbons over hydrogen will provide selective purging of these components and can be used in the invention. Examples of polymers that can be used to make such elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, and thermoplastic polyolefin elastomers.

The membrane used in the present invention differs from other membranes used in the past in refinery and petrochemical processing applications in that it is more permeable to hydrocarbons, including methane, than it is to hydrogen. In other words, unlike almost all other membranes, rubbery or glassy, the membrane is methane/hydrogen selective, that is, hydrogen rejecting, so that the permeate stream is hydrogen depleted and the residue stream is hydrogen enriched, compared with the membrane feed stream. To applicants' knowledge, among the polymeric membranes that perform gas separation based on the solution/diffusion mechanism, silicone rubber is the only material that is selective in favor of methane over hydrogen. As will now be appreciated by those of skill in the art, at least some of the benefits that accrue from the invention derive from the use of a membrane that is both polymeric and hydrogen rejecting. Thus, any polymeric membrane that is found to have a methane/hydrogen selectivity greater than 1 can be used for the processes disclosed herein and is within the scope of the invention. For example, other materials that might perhaps be found by appropriate experimentation to be methane/hydrogen selective include other polysiloxanes.

Another class of polymer materials that has at least a few members that should be methane/hydrogen selective, at least in multicomponent mixtures including other more condensable hydrocarbons, is the superglassy polymers, such as poly(1-trimethylsilyl-1-propyne) [PTMSP] and poly(4-methyl-2-pentyne) [PMP]. These differ from other polymeric membranes in that they do not separate component gases by solution/diffusion through the polymer. Rather, gas transport is believed to occur based on preferential sorption and diffusion on the surfaces of interconnected, comparatively long-lasting free-volume elements. Membranes and modules made from these polymers are less well developed to date; this class of materials is, therefore, less preferred than silicone rubber.

The use of a polymeric, hydrogen-rejecting membrane brings a number of advantages. First, it means that the hydrogen product stream is the membrane residue stream, and is thus available from the process at essentially the same pressure as the feed stream. In contrast, other membranes, including all conventional glassy membranes, deliver the hydrogen-enriched stream as the permeate stream, and the permeate stream, assuming a typical feed/permeate side pressure ratio of 2–10, be at a pressure of only 10% to half that of the feed. Since one frequent goal of the separation is to create a source of hydrogen for reuse in the plant, the ability to deliver this hydrogen without the need for recompression is very attractive.

A second benefit of preferential hydrocarbon permeation is that the membrane thereby serves as an expansion device for a gas fraction that undergoes significant Joule-Thomson cooling, as described in U.S. Pat. No. 5,762,685. As a result, the membrane separation step can produce streams that are significantly colder, such as 10° C., 20° C. or more colder, than the membrane feed stream. These streams can be used to provide cooling for the condensation step.

A third benefit, assuming the use of rubbery or superglassy membranes, is that they provide much higher transmembrane fluxes than conventional glassy membranes. For example, the permeability of silicone rubber to methane is 800 Barrer, compared with a permeability of less than 2 Barrer for 6 FDA polyimide or cellulose acetate, both used in conventional glassy membranes.

A fourth benefit, again assuming the use of silicone rubber or superglassy membranes, is that the membranes can tolerate relatively high concentrations of $C_{3+}$ hydrocarbons and contaminants such as hydrogen sulfide and water vapor. These materials simply pass through the membrane to the permeate side without damage to the membrane material itself. Thus the process of the invention can produce hydrogen residue streams that are both dried and reduced in hydrogen sulfide content. Also, many gas streams contain some water vapor, such as 0.1% or 0.5%. In addition to passing hydrocarbons and hydrogen sulfide, the membranes are very permeable to water vapor. In embodiments where the permeate stream is not recirculated, the water vapor will leave the process with the withdrawn permeate. In embodiments where the permeate stream is recirculated, as described below, the water vapor will also be recirculated and will leave the process loop in the condensate stream, from which it is easily separated by decanting, for example. In either case, this means that the hydrogen-rich residue stream is dry, that is, typically contains less than 50 ppm water. This greatly simplifies downstream use or further processing of this stream, such as by PSA.

The membrane may take any convenient form known in the art. The preferred form is a composite membrane including a microporous support layer for mechanical strength and a silicone rubber coating layer that is responsible for the separation properties. Additional layers may be included in the structure as desired, such as to provide strength, protect the selective layer from abrasion, and so on.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice. Since conventional polymeric materials are used for the membranes, they are relatively easy and inexpensive to prepare and to house in modules, compared with other types of membranes that might be used as hydrogen-rejecting membranes, such as finely microporous inorganic membranes, including adsorbent carbon membranes, pyrolysed carbon membranes and ceramic membranes.

To achieve a high flux of the preferentially permeating hydrocarbons, the selective layer responsible for the separation properties should be thin, preferably, but not necessarily, no more than 30 μm thick, more preferably no more than 20 μm thick, and most preferably no more than 5 μm thick. If superglassy materials are used, thicker membranes are possible.

A driving force for transmembrane permeation is typically provided by a pressure difference between the feed and permeate sides of the membrane. This pressure difference can be achieved by compressing the feed stream, by drawing a vacuum on the permeate side of the membrane, or both. If the off-gas stream 103 is already at high pressure, such as 150 psig or above, no additional driving force may need to be provided within the process.

Depending on the hydrocarbon composition of the membrane feed stream 105, a single-stage membrane separation operation may be adequate to raise the hydrogen content of the residue stream to an acceptable level, such as 50%, 60%, 70%, 80% or more. If the residue stream requires further purification, it may be passed to a second bank of modules for a second processing step. If the second residue stream requires further purification, it may be passed to a third bank of modules for a third processing step, and so on. Multistep configurations are well adapted to handle feed streams that contain relatively low concentrations of hydrogen, such as 20% hydrogen or 30% hydrogen. If the permeate stream requires further concentration, it may be passed to a second bank of modules for a second-stage treatment, and so on. Such multistage or multi step processes, and variants thereof, will be familiar to those of skill in the art, who will appreciate that the membrane separation step may be configured in many possible ways, including single-stage, multistage, multistep, or more complicated arrays of two or more units in series or cascade arrangements. Representative embodiments of a few of such arrangements are given in the examples below.

If the concentration of hydrogen in the feed stream is low, even a two-step or three-step process may not raise the hydrogen content of the hydrogen product stream to the desired level. In this case, it is convenient to pass the hydrogen product stream to a non-membrane treatment step, such as adsorption, for production of an appropriate purity hydrogen stream. Combinations of membrane separation with pressure swing adsorption (PSA) are particularly preferred in this regard. As mentioned above, the membrane separation step of the invention provides the hydrogen stream as feed for the PSA unit at pressure, not as a pressure-reduced permeate, thereby facilitating integration of the membrane separation step and the PSA step.

Turning to FIG. 2, this shows a process in which the condensation step is carried out by a combination of compression and cooling, in which the hydrocarbon fraction separation step is carried out by flashing under pressure reduction, and in which both the overhead flash gas and the membrane permeate stream are recirculated within the process. Hydrocarbon stream, 201, is subjected to a processing operation, 202, that yields off-gas stream 203. Off-gas stream 203 passes through compressor, 213, which produces compressed stream, 214. Stream 214 then passes through heat exchanger or chiller, 204, to lower the temperature, the combination of compression and cooling resulting in the formation of a condensed stream, 209, containing hydrocarbons and a small amount of dissolved hydrogen, and an uncondensed stream, 205, still containing some mixed hydrocarbons. The condensed stream or condensate, 209, then passes through expansion valve, 215, thereby reducing the pressure, and into flash tank, 210. The resulting volume of gas that is generated contains mostly hydrogen, $C_1$ and $C_2$ hydrocarbons and is withdrawn as overhead stream 212 and recirculated for recompression with stream 203.

The liquid product, which has now been twice enriched in the higher-boiling $C_{3+}$ hydrocarbons, is withdrawn as stream, 211.

The uncondensed stream, 205, is fed to membrane separation unit, 206. The membrane unit produces two streams, a residue hydrogen product stream, 207, and a hydrocarbon-enriched permeate stream, 208. The permeate stream is returned to the inlet side of compressor 213 with streams 203 and 212 for further processing.

Figure 3:
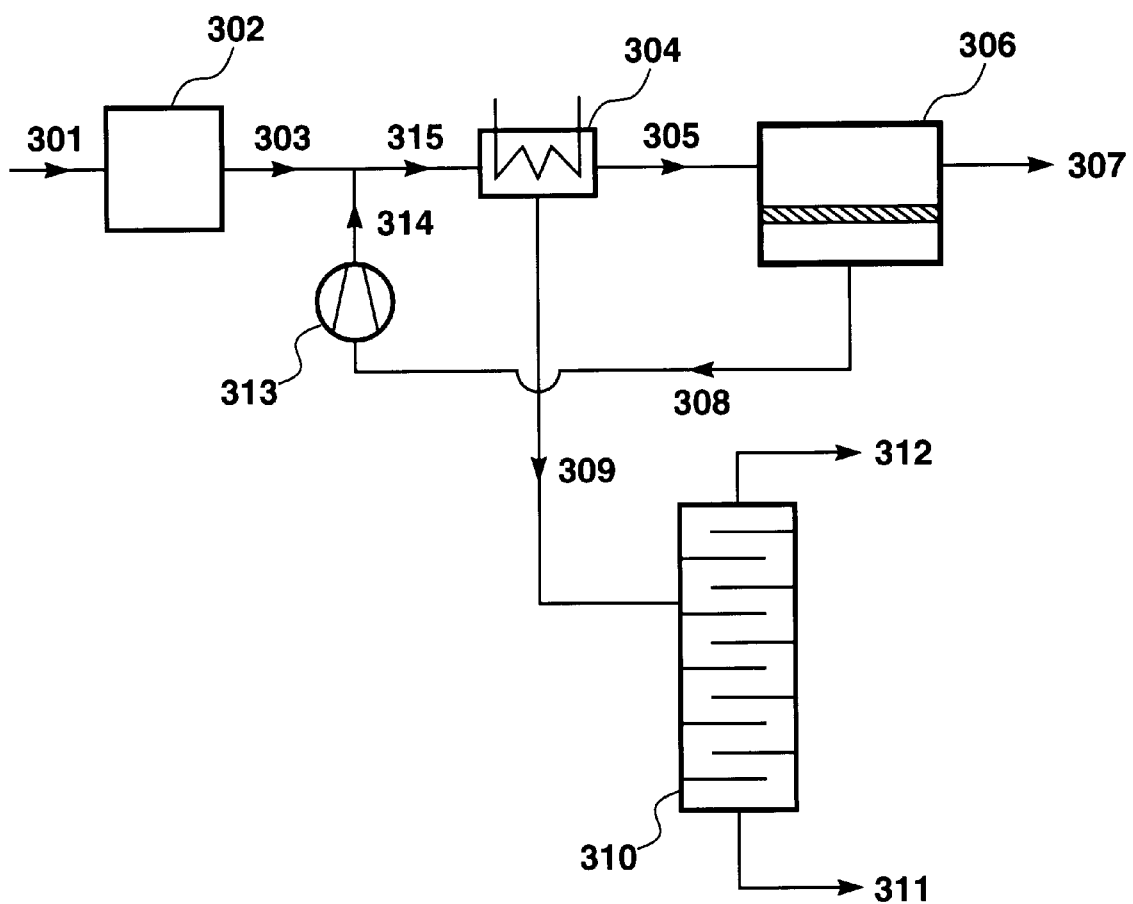
FIG. 3 is a schematic drawing showing an embodiment of the invention in which the hydrocarbon separation step is carried out in a distillation column.

FIG. 3 shows an embodiment in which recycle of the membrane permeate stream but not the hydrocarbon overhead stream is practiced. Hydrocarbon stream, 301, is subjected to a processing operation, 302, that yields off-gas stream 303. Off-gas stream 303, at high pressure, is combined with recompressed permeate stream 314 to form stream 315. Stream 315 is passed into heat exchanger or chiller, 304, forming condensed stream, 309, and uncondensed stream, 305. Stream 309 then passes into distillation column 310. Overhead lighter hydrocarbon gas stream, 312, is withdrawn, and may be used for fuel, for example. Liquid hydrocarbon product stream, 311, is withdrawn from the bottom of the column.

Uncondensed stream, 305, is fed to membrane separation unit, 306, where it is separated into residue hydrogen product stream, 307, and hydrocarbon-enriched permeate recycle stream, 308, which is recompressed in compressor 313. Recompressed stream 314 is returned to mix with stream 303.

Figure 7:
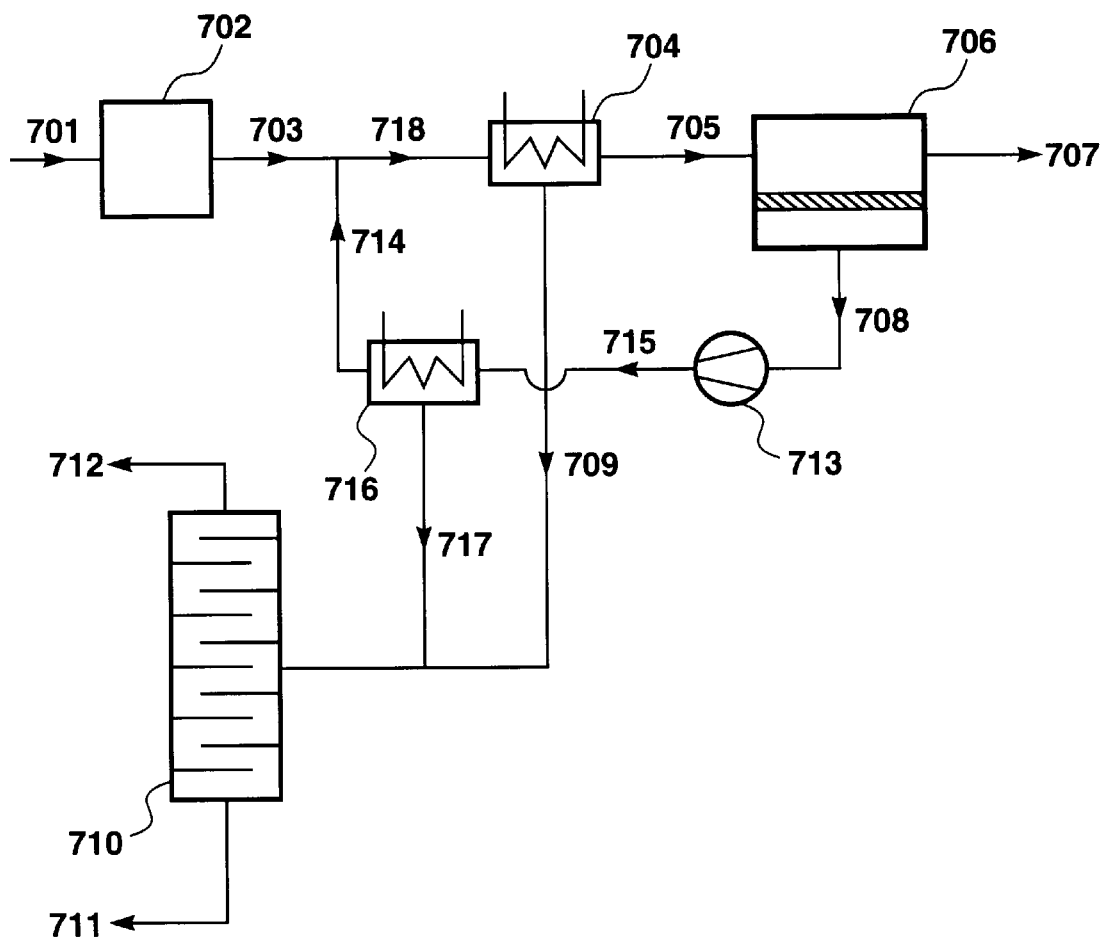
FIG. 7 is a schematic drawing showing an embodiment of the invention in which the permeate stream is recompressed and cooled before recirculation to the main condensation step.

A variant of the FIG. 3 embodiment is shown in FIG. 7. In this case, advantage is taken of the recompression of the permeate stream to perform an auxiliary condensation step in the permeate return line. Turning now to FIG. 7, the feed stream, 701, is subjected to a processing operation, 702, that yields off-gas stream 703. Stream 703, at high pressure, is mixed with recompressed stream 714 to form stream 718. Stream 718 is passed into heat exchanger or chiller, 704, forming condensed stream, 709, and uncondensed stream, 705. Stream 709 is joined with stream 717 and passes to deethanizer 710. Deethanizer overhead stream, 712, is withdrawn, and may be used for fuel, for example. Liquid hydrocarbon product stream, 711, is withdrawn from the bottom of the column.

Uncondensed stream 705 is fed to membrane separation unit 706, where it is separated into residue hydrogen product stream 707 and hydrocarbon-enriched permeate stream 708. The permeate is recompressed in compressor 713, and the compressed stream 715 is passed to a second heat exchanger or chiller, 716. Condensed stream 717 is mixed with stream 709 and passes to deethanizer 710. Compressed, uncondensed stream 714 is joined with stream 703 and recycled to the front of the first heat exchanger 704.

FIG. 4 shows an embodiment in which the membrane permeate stream is circulated to the distillation column, rather than being returned upstream to the condensation step. In this case, hydrocarbon stream, 401, is subjected to a processing operation, 402, that yields off-gas stream 403. Off-gas stream 403 passes through compressor, 413 and heat exchanger or chiller, 404, producing condensed stream, 409 and uncondensed stream, 405. Stream 409 then passes into distillation column 410. Overhead lighter hydrocarbon gas stream, 412, is withdrawn and recirculated for recompression with stream 403. Liquid hydrocarbon product stream, 411, is withdrawn from the bottom of the column.

Uncondensed stream, 405, is fed to membrane separation unit, 406, where it is separated into residue hydrogen product stream, 407, and hydrocarbon-enriched permeate recycle stream, 408. Stream 408 is passed to column 410 and introduced into the column at an appropriate point depending upon its composition.

FIG. 5 shows an embodiment in which the condensation step is performed in a dephlegmator. Hydrocarbon stream, 501, is subjected to a processing operation, 502, that yields off-gas stream 503. Off-gas stream 503 passes through compressor, 515, and into dephlegmator, 504. The vapor entering the dephlegmator as upward flowing gas in line 516 is cooled and a portion of the vapor condenses. This creates a downward flowing liquid on the walls of the channel which rectifies the incoming upflowing gas. Condensate exiting the rectification zone flows downward in line 516 and forms condensate stream, 511, which passes to hydrocarbon fraction separation step, 512, to be split into $C_{3+}$ product stream 514 and lighter hydrocarbon overhead stream, 513.

Uncondensed stream, 505, emerges from the dephlegmator and is fed to membrane separation unit, 506. The membrane unit produces two streams, a residue hydrogen product stream, 507, and a hydrocarbon-enriched permeate stream, 508.

With a hydrocarbon-selective membrane, the residue and permeate streams from the membrane unit are significantly colder than the membrane feed stream. This phenomenon, which is believed to arise because of Joule-Thomson cooling as the organic vapor expands across the membrane to the permeate side, is likely to occur if the membrane has a reasonably good selectivity for at least some of the hydrocarbons over hydrogen, the hydrocarbon content in the feed to the membrane unit is reasonably high, such as about 5%, 10% or more, and the removal of hydrocarbons from the membrane feed into the permeate is reasonably high, such as about 30%, 40%, 50% or more.

Since the conditions mentioned above frequently obtain during the separations to which our process can be applied according to the teachings herein, the membrane residue and permeate streams may typically be 5° C., 10° C. or more colder than the feed to the membrane unit. In the embodiment shown, residue stream 507 and permeate stream 508 enter the dephlegmator, are used to cool the incoming non-condensate stream, then exit as warmed hydrogen product stream 510 and warmed hydrocarbon-enriched permeate stream 509. Overhead stream 513 is also used for cooling in the dephlegmator and then exits the process as stream 517.

It will be appreciated by those of skill in the art that FIG. 5 shows only one representative embodiment of numerous possible embodiments that take advantage of heat integration by using one or more of the membrane permeate, membrane residue and fractionation overhead streams to provide some cooling of the incoming raw stream. Heat integration is preferred wherever practicable.

Figure 11:
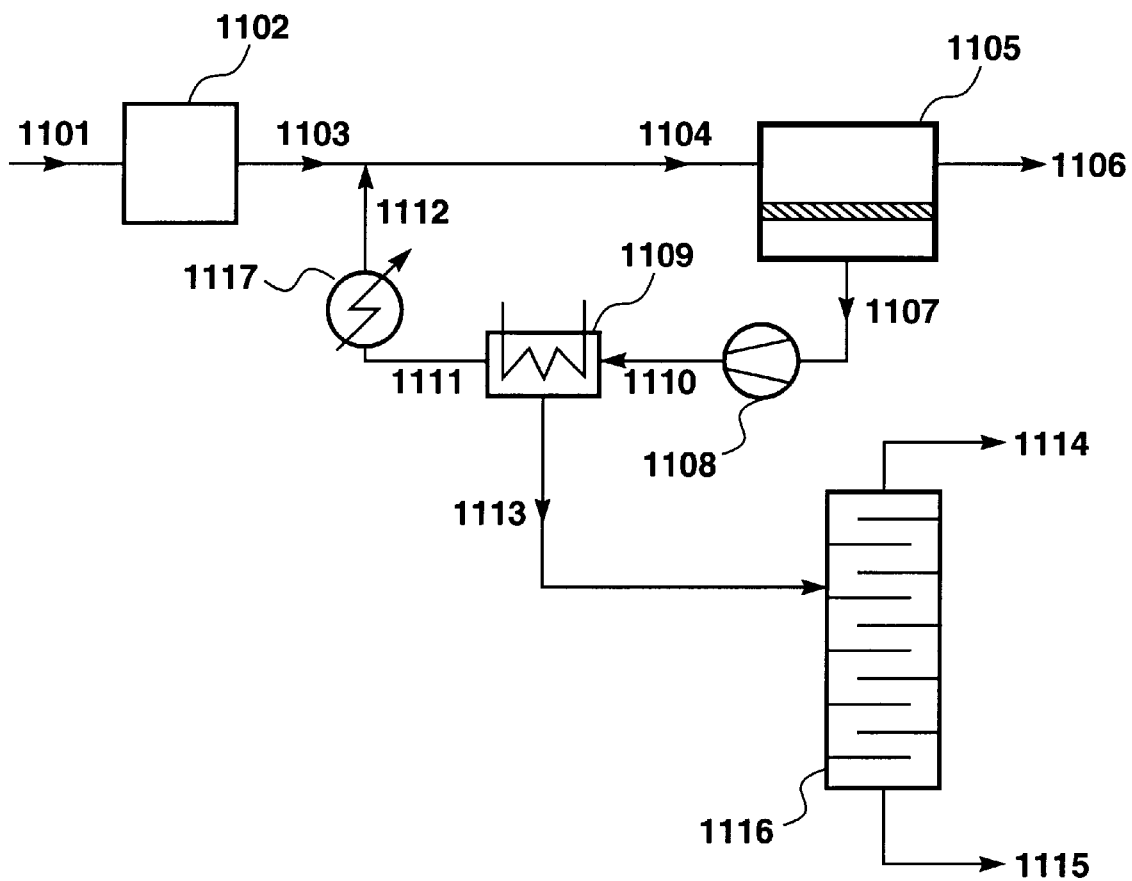
FIG. 11 is a schematic drawing showing an embodiment of the invention in which membrane separation step precedes the condensation step.

A conceptually different arrangement of the combination of steps in the invention is shown in FIG. 11. In this embodiment, the raw off-gas passes first to the membrane separation step, then to the condensation step. Turning now to FIG. 11, the feed stream, 1101, is subjected to a processing operation, 1102, that yields off-gas stream 1103. Off-gas stream 1103 is at high pressure and is mixed with uncondensed gas stream 1112 to form combined stream 1104. Stream 1104 is passed into membrane unit, 1105, producing a hydrogen-enriched residue stream, 1106, and a hydrocarbon-enriched permeate stream, 1107. The permeate stream is recompressed in compressor 1108 to form compressed stream 1110, which is passed to heat exchanger or chiller, 1109. Condensate stream 1113 is passed to deethanizer 1116. Deethanizer overhead stream, 1114, is withdrawn, and may be used for fuel, for example. Liquid hydrocarbon product stream, 1115, is withdrawn from the bottom of the column. Uncondensed stream 1111 is rewarmed in optional heater, 1117 and passes back as stream 1112 to be mixed with off-gas stream 1103 for further treatment.

As stated above, the process of the invention may be applied to any off-gas stream containing a mixture of hydrogen and light hydrocarbons. Representative, non-limiting locations in which the process of the invention is particularly useful are refineries and petrochemical plants.

The processes of the invention are especially attractive compared with other separation alternatives for:

1. Catalytic cracking: Treatment of off-gases previously destined for the fuel gas line, such as overhead gas from absorbers; treatment of overhead gas from strippers and debutanizers in fluid catalytic crackers, including specialized crackers, such as deep catalytic crackers.
2. Hydrotreating: Treatment of gas from high- and low-pressure separators and flash tanks in hydrotreating units of all kinds. Treatment of overhead light ends from product strippers and fractionators as appropriate. Treatment of off-gases and purge streams from amine scrubbers, or in some cases, replacement of amine scrubbers.
3. Hydrocracking: Clean up of recycle and other off-gas streams from hydrocrackers, such as overhead product gas from the product fractionators.
4. Catalytic reforming: Treatment of off-gas from product separators and stabilizers, for hydrogen recovery from fuel gas and light ends from reformer trains.
5. Coking: Treatment of light $C_{4-}$ reactor gases and gases from fractionators, splitters and strippers in delayed coking trains.
6. Distillate dewaxing: Recovery of hydrogen from high- and low-pressure separators for reuse in the process.
7. Gas plant operations: Recovery of hydrogen from light overheads from demethanizer and deethanizer columns in unsaturated and saturated gas plants.
8. Aromatics production/dealkvlation: Treatment of off-gas from product separator units, to recover hydrogen for recycle to the reactor feed, and of light ends from various sources.
9. Isomerization: Treatment of light ends from scrubbers, separators and the like in diverse isomerization reaction trains.
10. Hydrogenation/dehydrogenation: Treatment of hydrogen-rich streams from product separators and overhead light streams from strippers and other separation equipment.
11. Olefin production: Separation of methane and other light hydrocarbons from hydrogen in ethylene cracker off-gases from condensers and overhead streams from demethanizers. This application is discussed in detail in U.S. Pat. No. 5,785,739.

With respect to many applications of the type outlined above, the processes of the invention enable useful products to be retrieved from what was previously essentially a waste stream. In particular, many refinery streams that previously would have been sent to the foul gas or fuel gas line, where only the fuel value of the components is extracted, can now be processed to retrieve chemical value from at least a fraction of the components. Recovery of even a few extra percent of hydrogen, $C_{3+}$ hydrocarbons, or both, can bring substantial economic advantage, as shown in the examples below.

Further benefits accrue in that the recovered hydrogen can often be reused in the process generating the off-gas, or elsewhere in the refinery or plant. The ability to thereby provide a higher partial pressure of hydrogen in the reaction zone can be extremely beneficial in hydrotreating and other similar processes.

The invention is now illustrated in further detail by specific examples. These examples are intended to further clarify the invention, and are not intended to limit the scope in any way.

absorbers used to separate the $C_{3+}$ fraction from the lighter gas in the gas concentration section of the cracker plant.

Membrane pressure-normalized fluxes were assumed to be as follows, as are typical of a silicone rubber membrane:

| | |
|---|---|
| Hydrogen | $100 \times 10^{-6}$ cm$^3$(STP)/cm$^2 \cdot$ sec $\cdot$ cmHg |
| Methane | $140 \times 10^{-6}$ cm$^3$(STP)/cm$^2 \cdot$ sec $\cdot$ cmHg |
| Ethane | $350 \times 10^{-6}$ cm$^3$(STP)/cm$^2 \cdot$ sec $\cdot$ cmHg |
| Propane | $600 \times 10^{-6}$ cm$^3$(STP)/cm$^2 \cdot$ sec $\cdot$ cmHg |
| n-Butane | $1,400 \times 10^{-6}$ cm$^3$(STP)/cm$^2 \cdot$ sec $\cdot$ cmHg |
| n-Pentane | $2,000 \times 10^{-6}$ cm$^3$(STP)/cm$^2 \cdot$ sec $\cdot$ cmHg |
| Ethylene | $420 \times 10^{-6}$ cm$^3$(STP)/cm$^2 \cdot$ sec $\cdot$ cmHg |
| Propylene | $720 \times 10^{-6}$ cm$^3$(STP)/cm$^2 \cdot$ sec $\cdot$ cmHg |

The results of the calculations are shown in Table 1. The stream numbers correspond to FIG. 2.

TABLE 1

| Component/ Parameter | Stream 203 | Stream 214 | Stream 205 | Stream 208 | Stream 207 | Stream 209 | Stream 211 | Stream 212 |
|---|---|---|---|---|---|---|---|---|
| Mass Flow Rate (lb/h) | 16,632 | 40,575 | 24,001 | 21,383 | 2,618 | 16,574 | 13,998 | 2,576 |
| Temperature (° C.) | 35 | 113 | 5 | −16 | −16 | 5 | 16 | 16 |
| Pressure (psia) | 75 | 415 | 415 | 50 | 415 | 415 | 300 | 300 |
| Component (mol %) | | | | | | | | |
| Hydrogen | 20.0 | 16.7 | 23.2 | 15.7 | 50.0 | 1.0 | 0.2 | 4.4 |
| Methane | 15.0 | 16.2 | 21.0 | 17.3 | 34.3 | 4.5 | 2.2 | 14.1 |
| Ethane | 12.5 | 16.7 | 16.5 | 19.0 | 7.5 | 17.2 | 15.8 | 22.9 |
| Propane | 12.5 | 9.2 | 5.4 | 6.7 | 0.7 | 18.3 | 20.3 | 9.8 |
| n-Butane | 2.5 | 1.2 | 0.3 | 0.4 | — | 3.5 | 4.2 | 0.7 |
| n-Pentane | 2.5 | 1.1 | 0.1 | 0.1 | — | 3.4 | 4.2 | 0.2 |
| Ethylene | 10.0 | 18.8 | 20.4 | 24.3 | 6.4 | 14.8 | 12.3 | 25.1 |
| Propylene | 25.0 | 20.1 | 13.0 | 16.4 | 1.1 | 37.4 | 40.9 | 22.9 |

Membrane Area = 529 m$^2$
Theoretical Horsepower = 1149 hp
— = less than 0.01

EXAMPLES

Example 1

A computer calculation was performed with a modeling program, ChemCad III (ChemStations, Inc., Houston, Tex.), to simulate the treatment of a typical overhead stream from the absorbers of a fluid catalytic cracker unit (FCCU).

The stream was assumed to have a flow rate of 5 MMscfd and the following volume composition:

| | |
|---|---|
| Hydrogen | 20% |
| Methane | 15% |
| Ethane | 12.5% |
| Propane | 12.5% |
| n-Butane | 2.5% |
| n-Pentane | 2.5% |
| Ethylene | 10% |
| Propylene | 25% |

The treatment process was assumed to be carried out according to the process design shown in FIG. 2. Thus, box 202 in this case represents a catalytic cracker plant, and stream 203 represents the overhead stream from the light oil This process design recovers 98% of the $C_{3+}$ hydrocarbons and 74% of the ethylene in the feed gas as liquid stream 211, and requires refrigeration to only 5° C. The process also produces hydrogen stream 207, containing 50% hydrogen, compared with 20% hydrogen in the feed. Stream 207 could be subjected to an additional membrane separation step or steps, and/or to pressure swing adsorption to recover a high purity hydrogen stream for reuse.

This example shows that good recovery of the $C_{2+}$ hydrocarbons can be achieved without using condenser temperatures below 0° C.

Example 2

A computer calculation was performed as in Example 1 to simulate the treatment of a typical gas stream from the low pressure separator of a hydrotreater, such as is used to upgrade vacuum gas oil (VGO), residual oils or the like.

The stream was assumed to have a flow rate of 5 MMscfd, and the following volume composition:

| | |
|---|---|
| Hydrogen | 40% |
| Methane | 15% |
| Ethane | 15% |
| Propane | 10% |
| n-Butane | 10% |
| n-Pentane | 10% |

The treatment process was assumed to be carried out according to the process design shown in FIG. 2. Thus, box 202 in this case represents a hydrotreater/hydrocracker, and stream 203 represents the overhead stream from a low-pressure separator.

Membrane pressure-normalized fluxes were assumed to be as in Example 1. The results of the calculations are shown in Table 2. The stream numbers correspond to FIG. 2.

TABLE 2

| Component/Parameter | Stream 203 | Stream 214 | Stream 205 | Stream 208 | Stream 207 | Stream 209 | Stream 211 | Stream 212 |
|---|---|---|---|---|---|---|---|---|
| Mass Flow Rate (lb/h) | 14,600 | 22,293 | 10,645 | 7,467 | 3,178 | 11,649 | 11,427 | 221 |
| Temperature (° C.) | 35 | 124 | 5 | −3 | −3 | 5 | 24 | 24 |
| Pressure (psia) | 75 | 415 | 415 | 50 | 415 | 415 | 300 | 300 |
| Component (vol %) | | | | | | | | |
| Hydrogen | 40.0 | 38.5 | 50.4 | 36.7 | 65.0 | 1.4 | 0.6 | 22.5 |
| Methane | 15.0 | 16.6 | 20.7 | 19.0 | 22.6 | 3.9 | 3.0 | 23.6 |
| Ethane | 15.0 | 21.1 | 20.8 | 30.2 | 10.7 | 22.3 | 21.8 | 35.9 |
| Propane | 10.0 | 10.0 | 5.8 | 9.9 | 1.6 | 22.9 | 23.3 | 12.3 |
| Butane | 10.0 | 7.3 | 1.7 | 3.3 | 0.1 | 24.7 | 25.6 | 4.3 |
| Pentane | 10.0 | 6.4 | 0.5 | 1.0 | — | 24.8 | 25.7 | 1.4 |

Membrane Area = 343 m$^2$
Theoretical Horsepower = 787 hp
— = less than 0.01

This process design recovers 97% of the $C_{3+}$ hydrocarbons present in the feed gas. The membrane residue gas, stream 207, contains 65% hydrogen, compared with 40% hydrogen in the feed. Stream 207 could be subjected to an additional membrane separation step or steps, and/or to pressure swing adsorption to recover a high purity hydrogen stream for reuse. Alternatively, the stream could be used as a source of low-grade hydrogen, or sent to the fuel line.

Example 3

A computer calculation was performed as in Example 2 to simulate the treatment of another typical gas stream from the low-pressure separator of a hydrotreater.

The stream was assumed to have a flow rate of 5 MMscfd, and the following volume composition:

| | |
|---|---|
| Hydrogen | 70% |
| Methane | 7.5% |
| Ethane | 7.5% |
| Propane | 5% |
| n-Butane | 5% |
| n-Pentane | 5% |

Figure 8:
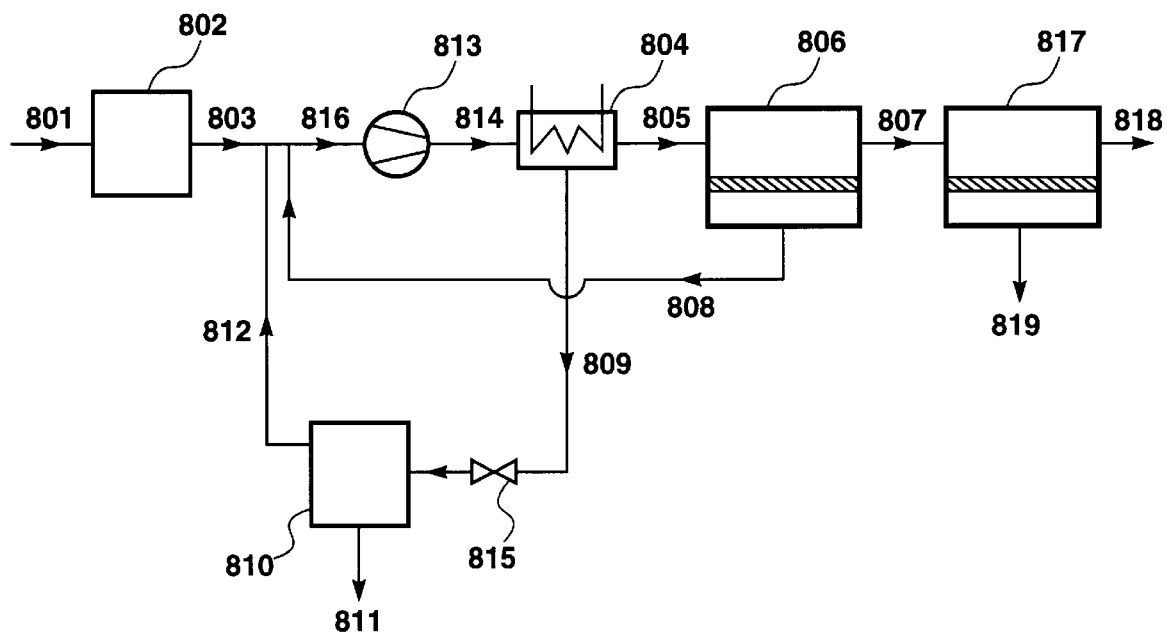
FIG. 8 is a schematic drawing showing an embodiment of the invention in which the membrane separation step is performed in two sub-steps.

The treatment process was assumed to be carried out according to the process design shown in FIG. 8. The design is similar to that of FIG. 2, with the addition of a second membrane step for further purification of the hydrogen product.

Turning now to FIG. 8, hydrocarbon stream 801 is subjected to a hydrotreating operation, 802, that yields off-gas stream 803. This stream is mixed with the flash overhead, 812 and the first membrane permeate, 808, to form combined stream 816. This stream passes through compressor, 813, which produces compressed stream, 814. Stream 814 then passes through heat exchanger or chiller, 804, to lower the temperature, the combination of compression and cooling resulting in the formation of a condensed stream, 809, containing hydrocarbons and a small amount of dissolved hydrogen, and an uncondensed stream, 805, still containing some mixed hydrocarbons. The condensed stream or condensate, 809, then passes through expansion valye, 815, thereby reducing the pressure, and into flash tank, 810. The resulting volume of gas that is generated contains mostly hydrogen, $C_1$ and $C_2$ hydrocarbons and is withdrawn as overhead stream 812 and recirculated for recompression with stream 803.

The liquid product, which has now been twice enriched in the higher-boiling $C_{3+}$ hydrocarbons, is withdrawn as stream, 811.

The uncondensed stream, 805, is fed to first membrane separation unit, 806. The membrane unit produces two streams, a hydrogen-enriched residue stream, 807, and a hydrocarbon-enriched permeate stream, 808. The permeate stream is returned to the inlet side of compressor 813 with streams 803 and 812 for further processing. The residue in line 807, containing mostly hydrogen and methane, is passed to second membrane unit, 817. The second residue stream, 818, contains 90% hydrogen and is suitable for recycle to the hydrotreater, thereby raising hydrogen partial pressure in the reactor. The second membrane permeate, 819, may be used as a fuel gas.

Membrane pressure-normalized fluxes were assumed to be as in Example 1. The results of the calculations are shown in Table 3. The stream numbers correspond to FIG. 8.

TABLE 3

| Component/ Parameter | Stream 803 | Stream 816 | Stream 814 | Stream 805 | Stream 808 | Stream 807 | Stream 809 | Stream 811 | Stream 812 | Stream 819 | Stream 818 |
|---|---|---|---|---|---|---|---|---|---|---|---|
| Mass Flow Rate (lb/h) | 7,885 | 13,790 | 13,790 | 8,745 | 5,874 | 2,871 | 5,045 | 5,018 | 27.0 | 2,051 | 819.6 |
| Temperature (° C.) | 35 | 31 | 146 | 5 | 1 | 1 | 5 | 25 | 25 | −1 | −1 |
| Pressure(psia) | 75 | 75 | 415 | 415 | 50 | 415 | 415 | 300 | 300 | 75 | 415 |
| Component (mol %) | | | | | | | | | | | |
| Hydrogen | 70.0 | 64.8 | 64.8 | 71.7 | 56.5 | 83.0 | 1.8 | 1.1 | 48.3 | 77.6 | 90.0 |
| Methane | 7.5 | 7.9 | 7.9 | 8.6 | 8.6 | 8.7 | 1.6 | 1.4 | 11.5 | 9.6 | 7.4 |
| Ethane | 7.5 | 12.1 | 12.1 | 12.0 | 19.5 | 6.4 | 13.4 | 13.2 | 22.1 | 9.7 | 2.3 |
| Propane | 5.0 | 7.0 | 7.0 | 5.3 | 10.2 | 1.7 | 22.5 | 22.7 | 11.7 | 2.7 | 0.3 |
| Butane | 5.0 | 4.6 | 4.6 | 1.9 | 4.0 | 0.2 | 29.9 | 30.3 | 4.8 | 0.4 | — |
| Pentane | 5.0 | 3.5 | 3.5 | 0.5 | 1.2 | — | 30.8 | 31.2 | 1.6 | — | — |

Membrane Area = 385 + 387 m$^2$
Theoretical Horsepower = 815 hp
— = less than 0.01

In this case, 89% of the $C_{3+}$ hydrocarbons are recovered. The second membrane permeate can be sent to the fuel line. Thus the gas sent to fuel is reduced from nearly 8,000 lb/h, without treatment, to only about 2,000 lb/h.

Example 4

Figure 9:
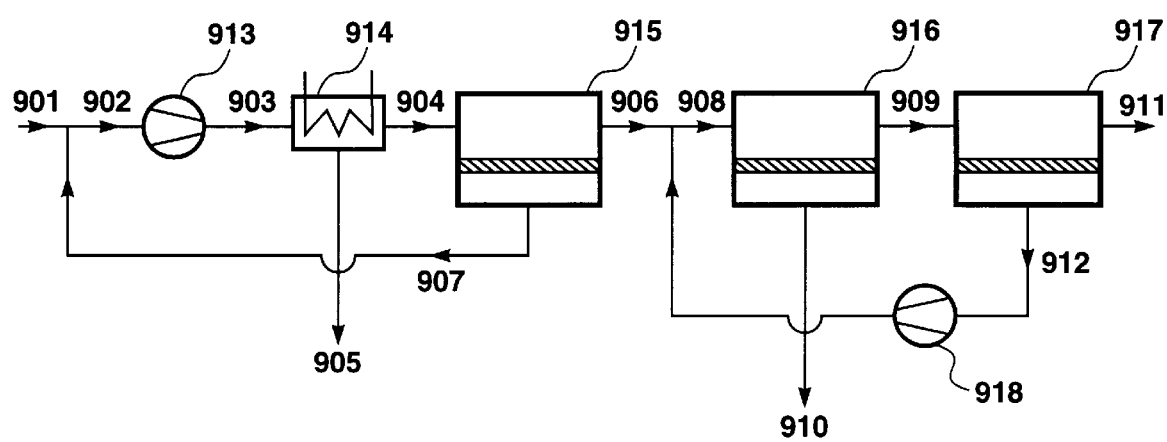
FIG. 9 is a schematic drawing showing an embodiment of the invention in which the membrane separation step is performed in three sub-steps.

A computer calculation was performed to model the treatment of the uncondensed stream from the condensation step of, for example, FIG. 1, by a three step membrane separation step. The arrangement of the membrane banks is shown in FIG. 9. Referring to this figure, stream 901 is combined with the first membrane permeate stream in line 907 to form stream 902 to the compressor, 913. The compressed stream in line 903 is fed to condenser, 914, from which hydrocarbon liquids are withdrawn via line 905. The non-condensed stream in line 904 forms the feed stream to the first membrane unit, 915. The hydrocarbon-enriched permeate is withdrawn via line 907, and is recycled to the front of the compressor. The first residue in line 906, is joined with third membrane permeate in line 912, to form the feed stream, 908, to the second membrane unit, 916. The second permeate is withdrawn via line 910. The second membrane residue, in line 909, is fed to the third membrane unit, 917. The third permeate in line 912 is recompressed in compressor 918, and is joined with the first membrane residue for additional treatment. The residue stream, 911, from the third membrane step is the hydrogen product stream.

Stream 901 was assumed to have a flow rate of 20 MMscfd, and the following volume composition:

| | |
|---|---|
| Hydrogen | 45.5% |
| Methane | 25% |
| Ethane | 14% |
| Propane | 10% |
| n-Butane | 3% |
| n-Pentane | 2.5% |

Each membrane step was assumed to contain a silicone rubber membrane providing pressure-normalized fluxes as in Example 1. The results of the calculations are shown in Table 4. The stream numbers correspond to FIG. 9.

TABLE 4

| Component/ Parameter | Stream 901 | Stream 903 | Stream 904 | Stream 905 | Stream 906 | Stream 909 | Stream 910 | Stream 911 | Stream 912 |
|---|---|---|---|---|---|---|---|---|---|
| Mass Flow Rate (lb/h) | 39,678 | 59,053 | 44,960 | 14,093 | 25,585 | 20,814 | 17,060 | 8,534 | 12,280 |
| Temperature (° C.) | 25 | 124 | 5 | 5 | 0 | 4 | 4 | 0 | 0 |
| Pressure (psia) | 75 | 415 | 415 | 415 | 415 | 415 | 75 | 415 | 75 |
| Component (mol %) | | | | | | | | | |
| Hydrogen | 45.5 | 41.2 | 45.3 | 1.4 | 52.0 | 57.0 | 37.4 | 65.0 | 47.7 |
| Methane | 25.0 | 24.2 | 26.2 | 5.0 | 27.9 | 29.5 | 27.1 | 28.7 | 30.5 |
| Ethane | 14.0 | 17.1 | 17.0 | 18.2 | 13.4 | 10.1 | 22.5 | 5.3 | 15.7 |
| Propane | 10.0 | 12.3 | 9.7 | 37.3 | 6.0 | 3.2 | 11.5 | 1.0 | 5.7 |
| n-Butane | 3.0 | 3.1 | 1.4 | 19.5 | 0.6 | 0.2 | 1.2 | 0.02 | 0.3 |
| n-Pentane | 2.5 | 2.1 | 0.4 | 18.6 | 0.1 | 0.03 | 0.3 | — | 0.07 |

Membrane Area = 767 + 1,000 + 1,111 m$^2$
Theoretical Horsepower = 2,570 + 732 hp
— = less than 0.01

The three-step process raises the hydrogen content from 45% to 65%. Stream 905 is sent to the hydrocarbon fraction separation step. Stream 910 could be sent to the fuel line or recirculated elsewhere.

Example 5

The calculation of Example 4 was repeated, this time assuming a stream of 4 MMscfd, with the following volume composition:

| | |
|---|---|
| Hydrogen | 61% |
| Methane | 20% |
| Ethane | 10% |
| Propane | 3% |
| n-Butane | 3% |
| n-Pentane | 3% |

The membrane pressure-normalized fluxes were as in Example 1. The results of the calculations are shown in Table 5. Stream numbers correspond to FIG. 9.

TABLE 5

| Component/ Parameter | Stream 901 | Stream 903 | Stream 904 | Stream 905 | Stream 906 | Stream 909 | Stream 910 | Stream 911 | Stream 912 |
|---|---|---|---|---|---|---|---|---|---|
| Mass Flow Rate (lb/h) | 6,158 | 13,166 | 11,166 | 2,000 | 4,158 | 3,254 | 2,417 | 1,741 | 1,514 |
| Temperature (° C.) | 25 | 59 | 5 | 5 | 2 | 5 | 5 | 3 | 4 |
| Pressure (psia) | 210 | 415 | 415 | 415 | 415 | 415 | 30 | 415 | 50 |
| Component (mol %) | | | | | | | | | |
| Hydrogen | 61.0 | 56.7 | 58.9 | 1.5 | 65.6 | 70.0 | 49.2 | 75.0 | 60.5 |
| Methane | 20.0 | 20.9 | 21.5 | 3.9 | 21.2 | 21.8 | 22.0 | 20.7 | 24.0 |
| Ethane | 10.0 | 13.7 | 13.6 | 14.9 | 9.7 | 7.0 | 19.9 | 3.9 | 12.8 |
| Propane | 3.0 | 3.8 | 3.4 | 14.1 | 2.1 | 1.0 | 5.2 | 0.4 | 2.1 |
| n-Butane | 3.0 | 2.9 | 1.9 | 28.9 | 1.0 | 0.2 | 2.7 | 0.03 | 0.4 |
| n-Pentane | 3.0 | 2.0 | 0.7 | 36.8 | 0.3 | 0.04 | 0.9 | — | 0.1 |

Membrane Area = 125 + 163 + 181 m$^2$
Theoretical Horsepower = 285 + 158 hp
— = less than 0.01

In this case, the hydrogen content of the hydrogen product stream is increased from 61% to 75%. Stream 905 is again sent to the hydrocarbon fraction separation step, and stream 910 could be used for fuel gas.

Example 6

Figure 10:
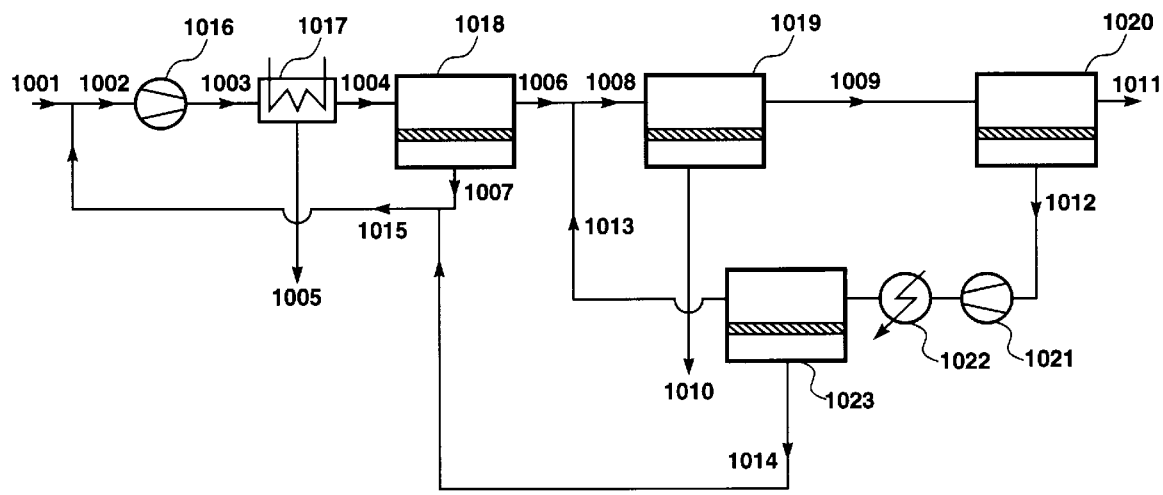
FIG. 10 is a schematic drawing showing an embodiment of the invention in which the membrane separation step is performed by a membrane array.

A computer calculation was performed to model the treatment of the uncondensed stream from the condensation step of, for example, FIG. 1, by a three-step, two-stage membrane array. The arrangement of the membrane banks is shown in FIG. 10. Referring to this figure, line 1001 is combined with the recycle stream in line 1015 to form stream 1002 to the compressor, 1016. The compressed stream in line 1003 is fed to condenser, 1017, from which is withdrawn hydrocarbon liquids via line 1005. The non-condensed stream in line 1004 forms the feed to the first membrane unit, 1018. The hydrocarbon-enriched permeate is withdrawn via line 1007, and is recycled via line 1015 to the front of the compressor. The first residue in line 1006, is joined with fourth membrane residue in line 1013, to form the feed stream, 1008, to the second membrane unit, 1019. The second permeate is withdrawn via line 1010. The second membrane residue, in line 1009, is fed to the third membrane unit, 1020. The third membrane residue in line 1011 is the hydrogen product stream. The third permeate in line 1012 is recompressed in compressor 1021, chilled in chiller 1022, and fed to fourth membrane unit, 1023. The fourth membrane residue is recycled via line 1013 to join with the first membrane residue, 1006, for additional treatment in the second membrane unit. Fourth membrane permeate, 1014, joins with first membrane permeate, 1007, to form stream 1015, which is recycled back to the front of the process.

The stream was assumed to have a flow rate of 20 MMscfd, and the following volume composition:

| | |
|---|---|
| Hydrogen | 20% |
| Methane | 15% |
| Ethane | 15% |
| Propane | 40% |
| n-Butane | 10% |

Each membrane step was assumed to contain a silicone rubber membrane providing pressure-normalized fluxes as in Example 1. The results of the calculations are shown in Table 6. Stream numbers correspond to FIG. 10.

TABLE 6

| Component/ Parameter | Stream 1001 | Stream 1002 | Stream 1004 | Stream 1005 | Stream 1008 | Stream 1010 | Stream 1011 | Stream 1012 |
|---|---|---|---|---|---|---|---|---|
| Mass Flow Rate (lb/h) | 71,421 | 90,277 | 29,131 | 61,147 | 13,657 | 5,253 | 5,009 | 3,394 |
| Temperature (° C.) | 25 | 23 | 5 | 5 | −1 | −5 | −8 | −8 |
| Pressure (psia) | 75 | 75 | 415 | 415 | 415 | 75 | 415 | 50 |
| Component (mol %) | | | | | | | | |
| Hydrogen | 20.0 | 21.1 | 38.9 | 1.4 | 50.0 | 36.8 | 60.0 | 42.7 |
| Methane | 15.0 | 16.8 | 27.0 | 5.5 | 31.6 | 29.9 | 32.1 | 32.4 |
| Ethane | 15.0 | 17.1 | 16.5 | 17.7 | 11.5 | 18.9 | 5.9 | 15.5 |
| Propane | 40.0 | 36.9 | 16.3 | 59.7 | 6.8 | 13.9 | 2.0 | 9.2 |
| n-Butane | 10.0 | 8.1 | 1.2 | 15.7 | 0.2 | 0.5 | 0.02 | 0.2 |

Membrane Area = 523 + 315 + 245 + 68 m$^2$
Theoretical Horsepower = 2,366 + 225 hp
— = less than 0.01

With this design, a hydrogen product stream having a hydrogen content of 60% can be produced from a 20% hydrogen feed. Stream 1005 is sent to the hydrocarbon fraction separation step. Stream 1010 could be sent to the fuel line or recirculated elsewhere.

Example 7

A computer calculation was performed to simulate the treatment of a typical off-gas stream from a hydrotreater process. The stream was assumed to have a flow rate of 20 MMscfd, and the following volume composition:

| | |
|---|---|
| Hydrogen | 45.5% |
| Methane | 25% |
| Ethane | 14% |
| Propane | 10% |
| n-Butane | 3% |
| n-Pentane | 2.5% |

The treatment process was assumed to be carried out according to the process design shown in FIG. 1, in which unit 110 was assumed to be a ten-stage deethanizer.

Membrane pressure-normalized fluxes were assumed to be as in Example 1. The results of the calculations are shown in Table 7. The stream numbers correspond to FIG. 1.

The process produces a hydrogen product stream, 107, with a hydrogen content of 60% at 300 psia. The hydrogen content and pressure of this stream make it well suited for further purification by pressure swing adsorption, if desired. The process also produces a $C_{3+}$ hydrocarbon product stream with a $C_{3+}$ content of 95%. Streams 112 and 108 could be sent to the fuel gas line, in which case the gas sent to the fuel line is reduced from about 40,000 lb/h to about 15,000 lb/h. Alternatively, stream 108, still containing nearly 13% $C_{3+}$ hydrocarbons, could be sent for further processing to recover additional $C_{3+}$ components before being sent on to the fuel line.

Example 8

The calculation of Example 7 was repeated, except that in this case the hydrocarbon fraction separation step was assumed to be carried out as a single-stage flash separation, so that unit 110 is a flash tank. The results of the calculations are shown in Table 8. The stream numbers correspond to FIG. 1.

TABLE 7

| Component/ Parameter | Stream 103 | Stream 105 | Stream 109 | Stream 111 | Stream 112 | Stream 107 | Stream 108 |
|---|---|---|---|---|---|---|---|
| Mass Flow Rate (lb/h) | 39,678 | 25,479 | 14,199 | 12,601 | 1,599 | 11,975 | 13,504 |
| Temperature (° C.) | 128 | −20 | −20 | 81 | −16 | −24 | −24 |
| Pressure (psia) | 300 | 300 | 300 | 300 | 300 | 300 | 50 |
| Component (mol %) | | | | | | | |
| Hydrogen | 45.5 | 52.1 | 0.9 | 0.0 | 4.3 | 60.0 | 39.4 |
| Methane | 25.0 | 28.0 | 4.7 | — | 22.7 | 28.7 | 26.8 |
| Ethane | 14.0 | 13.3 | 18.5 | 5.0 | 70.4 | 8.5 | 21.0 |
| Propane | 10.0 | 5.9 | 38.2 | 47.5 | 2.6 | 2.6 | 11.1 |
| n-Butane | 3.0 | 0.6 | 19.1 | 24.1 | — | 0.1 | 1.4 |
| n-Pentane | 2.5 | 0.1 | 18.6 | 23.4 | 0.0 | 0.03 | 0.3 |

Membrane Area = 1,131 m²
Theoretical Horsepower = 1,812 hp
— = less than 0.01

TABLE 8

| Component/ Parameter | Stream 103 | Stream 105 | Stream 109 | Stream 111 | Stream 112 | Stream 107 | Stream 108 |
|---|---|---|---|---|---|---|---|
| Mass Flow Rate (lb/h) | 39,678 | 25,479 | 14,199 | 12,856 | 1,344 | 11,975 | 13,504 |
| Temperature (° C.) | 128 | −20 | −20 | 25 | 25 | −24 | −24 |
| Pressure (psia) | 300 | 300 | 300 | 200 | 200 | 300 | 50 |
| Component (mol %) | | | | | | | |
| Hydrogen | 45.5 | 52.1 | 0.9 | 0.1 | 5.7 | 60.0 | 39.4 |
| Methane | 25.0 | 28.0 | 4.7 | 1.9 | 21.4 | 28.7 | 26.8 |
| Ethane | 14.0 | 13.3 | 18.5 | 15.5 | 36.5 | 8.5 | 21.0 |
| Propane | 10.0 | 5.9 | 38.2 | 39.6 | 29.7 | 2.6 | 11.1 |
| n-Butane | 3.0 | 0.6 | 19.1 | 21.5 | 5.1 | 0.1 | 1.4 |
| n-Pentane | 2.5 | 0.1 | 18.6 | 21.4 | 1.7 | 0.03 | 0.3 |

Membrane Area = 1,131 m²
Theoretical Horsepower = 1,812 hp
— = less than 0.01

The process again produces a hydrogen product stream, 107, with a hydrogen content of 60% at 300 psia. The hydrogen content and pressure of this stream make it well suited for further purification by pressure swing adsorption, if desired. However, since this process uses only a single-stage flash unit, compared to the ten-stage deethanizer of Example 7, more $C_1$ and $C_2$ hydrocarbons are left in the hydrocarbon product stream, 111, which now contains only about 83% $C_{3+}$ hydrocarbons, compared to 95% $C_{3+}$ hydrocarbons in Example 7.

Example 9

A computer calculation was performed to simulate the treatment of the same stream as in Examples 7 and 8. This time, the treatment process was assumed to be carried out according to the process design shown in FIG. 3, in which unit 310 was assumed to be a ten-stage deethanizer. This process design differs from that of FIG. 1 in that the membrane permeate stream, 308, is recirculated to the condensation step for additional recovery of $C_{3+}$ components.

Membrane pressure-normalized fluxes were assumed to be as in Example 1. The results of the calculations are shown in Table 9. The stream numbers correspond to FIG. 3.

content of this stream is rather low for further purification by pressure swing adsorption; additional membrane treatment of stream 307 would bring the concentration of this stream to a level better suited to a pressure swing adsorption process.

This process also produces a $C_{3+}$ hydrocarbon product stream, 311, with a $C_{3+}$ content of 95%. Stream 312 is 90% light hydrocarbons, and could be sent to the fuel gas line, in which case the gas sent to the fuel line is reduced from about 40,000 lb/h to about 3,000 lb/h.

Example 10

A computer calculation was performed to simulate the treatment of the same stream as in Examples 7–9. This time, the treatment process was assumed to be carried out according to the process design of FIG. 7, in which an auxiliary condensation step is performed on the permeate stream before it is recirculated to the main process line.

Membrane pressure-normalized fluxes were assumed to be as in Example 1. The results of the calculations are shown in Table 10. The stream numbers correspond to FIG. 7.

TABLE 9

| Component/Parameter | Stream 303 | Stream 315 | Stream 305 | Stream 307 | Stream 308 | Stream 314 | Stream 309 | Stream 311 | Stream 312 |
|---|---|---|---|---|---|---|---|---|---|
| Mass Flow Rate (lb/h) | 39,678 | 92,760 | 74,197 | 21,125 | 53,071 | 53,071 | 18,563 | 15,568 | 2,995 |
| Temperature (° C.) | 25 | 59 | 5 | −5 | −5 | 93 | 5 | 77 | −10 |
| Pressure (psia) | 415 | 415 | 415 | 415 | 75 | 415 | 415 | 300 | 300 |
| Component (mol %) | | | | | | | | | |
| Hydrogen | 45.5 | 37.0 | 40.4 | 55.0 | 28.9 | 28.9 | 1.3 | 0.0 | 4.9 |
| Methane | 25.0 | 23.8 | 25.6 | 29.3 | 22.7 | 22.7 | 5.0 | — | 18.4 |
| Ethane | 14.0 | 21.7 | 21.6 | 12.1 | 29.1 | 29.1 | 22.9 | 5.0 | 71.3 |
| Propane | 10.0 | 13.4 | 10.9 | 3.4 | 16.7 | 16.7 | 40.5 | 53.6 | 5.4 |
| n-Butane | 3.0 | 2.5 | 1.2 | 0.1 | 2.1 | 2.1 | 16.2 | 22.3 | — |
| n-Pentane | 2.5 | 1.5 | 0.3 | 0.03 | 0.5 | 0.5 | 14.0 | 19.2 | 0.0 |

Membrane Area = 2,187 $m^2$
Theoretical Horsepower = 1,768 hp
— = less than 0.01

This process produces a hydrogen product stream, 307, with a hydrogen content of 55% at 415 psia. The hydrogen

TABLE 10

| Component/Parameter | Stream 703 | Stream 718 | Stream 705 | Stream 707 | Stream 708 | Stream 715 | Stream 714 | Stream 709 | Stream 717 | Stream 711 | Stream 712 |
|---|---|---|---|---|---|---|---|---|---|---|---|
| Mass Flow Rate (lb/h) | 39,678 | 70,913 | 60,086 | 21,260 | 38,826 | 38,826 | 31,258 | 10,827 | 7,568 | 15,260 | 3,134 |
| Temperature (° C.) | 25 | 18 | 5 | −3 | −3 | 96 | 5 | 5 | 5 | 77 | −10 |
| Pressure (psia) | 415 | 415 | 415 | 415 | 75 | 415 | 415 | 415 | 415 | 300 | 300 |
| Component (mol %) | | | | | | | | | | | |
| Hydrogen | 45.5 | 40.7 | 43.1 | 55.0 | 30.5 | 30.5 | 33.8 | 1.3 | 1.2 | 0.0 | 4.5 |
| Methane | 25.0 | 25.2 | 26.5 | 29.3 | 23.5 | 23.5 | 25.5 | 5.0 | 5.2 | — | 18.0 |
| Ethane | 14.0 | 19.4 | 19.3 | 11.8 | 27.1 | 27.1 | 27.0 | 20.6 | 28.5 | 5.0 | 72.3 |
| Propane | 10.0 | 11.0 | 9.5 | 3.6 | 15.6 | 15.6 | 12.4 | 36.0 | 44.5 | 53.4 | 5.1 |
| n-Butane | 3.0 | 2.2 | 1.3 | 0.2 | 2.4 | 2.4 | 1.1 | 17.5 | 13.9 | 22.2 | — |
| n-Pentane | 2.5 | 1.5 | 0.4 | 0.05 | 0.8 | 0.8 | 0.2 | 19.6 | 6.7 | 19.4 | 0.0 |

Membrane Area = 1,686 $m^2$
Theoretical Horsepower = 1,340 hp
— = less than 0.01

This process produces a hydrogen product stream, 707, with a hydrogen content of 55% at 415 psia, as did the design of FIG. 3. Again, additional membrane treatment of stream 707 would bring the concentration of this stream to a level better suited to further purification by a pressure swing adsorption process.

As with the design of FIG. 3, the design of FIG. 7 also produces a $C_{3+}$ hydrocarbon product stream, 711, with a $C_{3+}$ content of 95%, and a fuel gas stream, 712, of 90% light hydrocarbons.

The advantage of the process design of FIG. 7 is that it uses 23% less membrane area and 24% less horsepower than the design of FIG. 3 to produce the same quality of hydrocarbon product stream and fuel gas stream.

Example 11

A computer calculation was performed to simulate the treatment of the same stream as in Examples 7–10. This time, the treatment process was assumed to be carried out according to the process design of FIG. 11, in which the membrane separation step precedes the condensation step.

Membrane pressure-normalized fluxes were assumed to be as in Example 1. The pressure on the permeate side of the membrane was assumed to be 50 psia, compared with 75 psia in Examples 9 and 10. The results of the calculations are shown in Table 11. The stream numbers correspond to FIG. 11.

Example 12

A computer calculation was performed to simulate the treatment of a typical stream from a hydrotreater process. The stream was assumed to have a flow rate of 20 MMscfd, and the following volume composition:

| | |
|---|---|
| Hydrogen | 45.5% |
| Methane | 25% |
| Ethane | 14% |
| Propane | 10% |
| n-Butane | 3% |
| n-Pentane | 2.5% |

Figure 6:
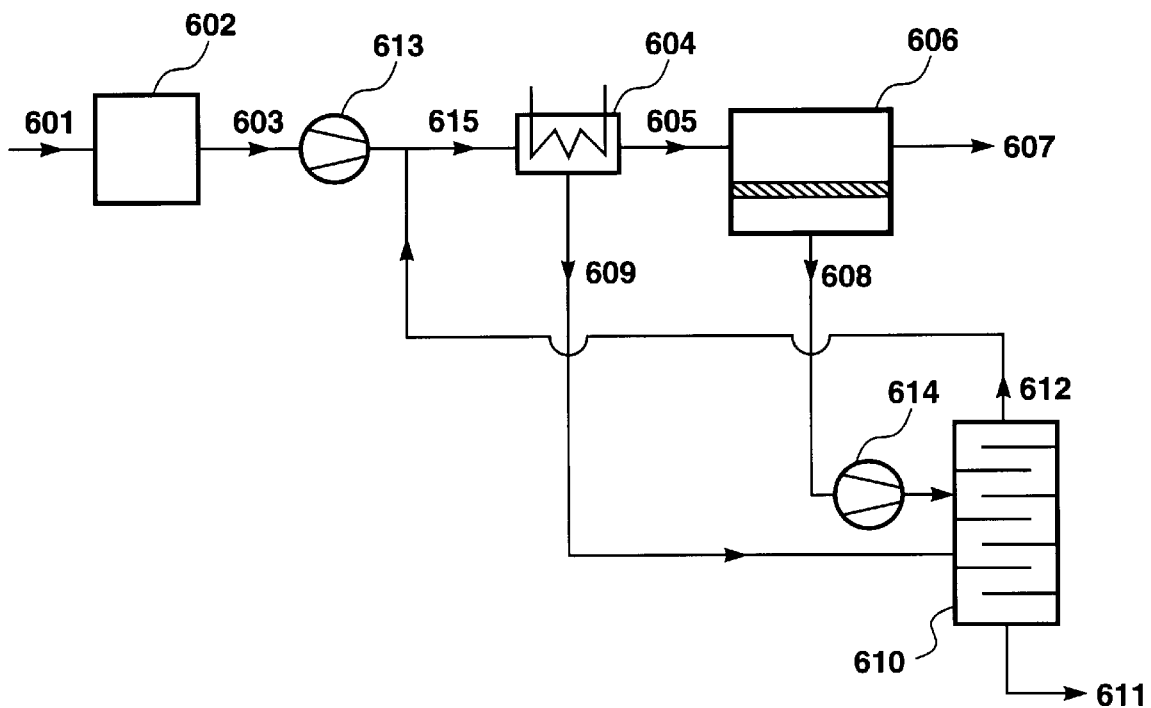
FIG. 6 is a schematic drawing showing an embodiment of the invention in which a deethanizer column is used and in which the deethanizer column overhead is recirculated to the condensation step.

The treatment process was assumed to be carried out according to the process design shown in FIG. 6, in which unit 610 was assumed to be a seven-stage deethanizer. Like the design of FIG. 4, this design also passes both the liquid condensate and the membrane permeate to the deethanizer. However, in this case, the permeate stream is recompressed to 300 psia in compressor 614. The deethanizer gaseous overhead stream is recycled to the cooling step for further hydrocarbon recovery.

In FIG. 6, the feed stream, 601, is subjected to a processing operation, 602, that yields off-gas stream 603. Stream 603 passes through compressor 613 and is mixed with distillation overhead stream 612 to form combined stream 615. Stream 615 is passed to heat exchanger or chiller, 604,

TABLE 11

| Component/ Parameter | Stream 1103 | Stream 1104 | Stream 1106 | Stream 1107 | Stream 1110 | Stream 1111 | Stream 1112 | Stream 1113 | Stream 1114 | Stream 1115 |
|---|---|---|---|---|---|---|---|---|---|---|
| Mass Flow Rate (lb/h) | 39,678 | 61,075 | 21,483 | 39,593 | 39,593 | 21,408 | 21,408 | 18,185 | 3,368 | 14,817 |
| Temperature (° C.) | 25 | 47 | 39 | 39 | 156 | 5 | 50 | 5 | −11 | 77 |
| Pressure (psia) | 415 | 415 | 415 | 50 | 415 | 415 | 415 | 415 | 300 | 300 |
| Component (mol %) | | | | | | | | | | |
| Hydrogen | 45.5 | 42.5 | 55.0 | 27.4 | 27.4 | 36.5 | 36.5 | 1.2 | 4.0 | 0.0 |
| Methane | 25.0 | 25.6 | 29.2 | 21.3 | 21.3 | 26.8 | 26.8 | 5.3 | 17.4 | — |
| Ethane | 14.0 | 17.6 | 11.4 | 25.1 | 25.1 | 24.7 | 24.7 | 26.1 | 74.6 | 5.0 |
| Propane | 10.0 | 10.2 | 3.9 | 17.6 | 17.6 | 10.5 | 10.5 | 38.4 | 4.0 | 53.5 |
| n-Butane | 3.0 | 2.4 | 0.3 | 4.9 | 4.9 | 1.2 | 1.2 | 15.5 | — | 22.2 |
| n-Pentane | 2.5 | 1.8 | 0.2 | 3.7 | 3.7 | 0.3 | 0.3 | 13.5 | 0.0 | 19.3 |

Membrane Area = 1,274 m$^2$
Theoretical Horsepower = 1,715 hp
— = less than 0.01

This process produces a hydrogen product stream, 1106, with a hydrogen content of 55% at 415 psia, as did the designs of FIGS. 3 and 7. Again, additional membrane treatment of stream 1106 would bring the concentration of this stream to a level better suited to further purification by a pressure swing adsorption process.

As with the designs of FIGS. 3 and 7, the design of FIG. 11 also produces a $C_{3+}$ hydrocarbon product stream, 1115, with a $C_{3+}$ hydrocarbon content of 95%, and a fuel gas stream, 1114, of 92% light hydrocarbons.

In this case, the greater transmembrane driving force provided by the lower permeate pressure means that the separation can be carried out using a substantially smaller membrane area than in Examples 9 and 10. However, stream 1107 requires more recompression capacity to bring it to 415 psia for remixing with stream 1103.

forming condensed stream, 609, and uncondensed stream, 605. Stream 609 passes to distillation column 610. Distillation overhead stream, 612, is withdrawn, and joined with the compressed feed stream. The liquid distillate stream, 611, is withdrawn from the bottom of the column.

Uncondensed stream 605 is fed to membrane separation unit 606, where it is separated into residue hydrogen product stream 607 and hydrocarbon-enriched permeate stream 608. Stream 608 is recompressed in compressor 614, and is introduced into distillation column 610 at an appropriate point depending upon its composition.

Membrane pressure-nornalized fluxes were assumed to be as in Example 1. The results of the calculations are shown in Table 12. The stream numbers correspond to FIG. 6.

TABLE 12

| Component/Parameter | Stream 603 | Stream 615 | Stream 605 | Stream 607 | Stream 608 | Stream 609 | Stream 611 | Stream 612 |
|---|---|---|---|---|---|---|---|---|
| Mass Flow Rate (lb/h) | 39,678 | 76,394 | 53,609 | 23,923 | 29,686 | 22,785 | 15,778 | 36,716 |
| Temperature (° C.) | 25 | 70 | −20 | −26 | −26 | −20 | 82 | −9 |
| Pressure (psia) | 60 | 300 | 300 | 300 | 50 | 300 | 300 | 300 |
| Component (mol %) | | | | | | | | |
| Hydrogen | 45.5 | 37.1 | 42.7 | 52.3 | 29.4 | 0.8 | 0.0 | 25.5 |
| Methane | 25.0 | 23.4 | 26.4 | 28.7 | 23.1 | 4.6 | — | 21.3 |
| Ethane | 14.0 | 25.0 | 23.8 | 15.9 | 34.8 | 32.5 | 1.0 | 40.1 |
| Propane | 10.0 | 11.3 | 6.7 | 3.0 | 11.8 | 41.3 | 57.2 | 13.2 |
| n-Butane | 3.0 | 1.7 | 0.4 | 0.1 | 0.8 | 10.6 | 22.6 | 0.02 |
| n-Pentane | 2.5 | 1.4 | 0.1 | — | 0.2 | 10.2 | 19.2 | — |

Membrane Area = 1,825 m$^2$
Theoretical Horsepower = 1,812 + 1,049 hp
— = less than 0.01

This process produces two streams: a hydrocarbon stream, 611, containing 99% $C_{3+}$ hydrocarbons, and a hydrogen-enriched stream, 607, containing 52% hydrogen and only 3% $C_{3+}$ hydrocarbons.

Membrane pressure-normalized fluxes were assumed to be as in Example 1. The results of the calculations are shown in Table 13. The stream numbers correspond to FIG. 6.

TABLE 13

| Component/Parameter | Stream 603 | Stream 605 | Stream 607 | Stream 608 | Stream 609 | Stream 611 | Stream 612 |
|---|---|---|---|---|---|---|---|
| Mass Flow Rate (lb/h) | 16,632 | 4,542 | 1,758 | 2,784 | 12,090 | 13,723 | 1,151 |
| Temperature (° C.) | 25 | −20 | −27 | −27 | −20 | 27 | −77 |
| Pressure (psia) | 60 | 300 | 300 | 50 | 300 | 300 | 300 |
| Component (mol %) | | | | | | | |
| Hydrogen | 20.0 | 40.7 | 52.4 | 26.9 | 0.8 | 0.0 | 40.0 |
| Methane | 15.0 | 26.2 | 29.8 | 22.0 | 4.6 | 0.5 | 43.7 |
| Ethane | 12.5 | 10.5 | 7.1 | 14.7 | 14.3 | 17.4 | 3.6 |
| Propane | 12.5 | 3.4 | 1.5 | 5.7 | 20.9 | 20.9 | — |
| n-Butane | 2.5 | 0.2 | 0.03 | 0.3 | 4.7 | 4.3 | 0.0 |
| n-Pentane | 2.5 | 0.04 | — | 0.1 | 4.8 | 4.3 | 0.0 |
| Ethylene | 10.0 | 10.8 | 6.3 | 16.1 | 9.2 | 10.9 | 12.7 |
| Propylene | 25.0 | 8.1 | 3.0 | 14.2 | 40.7 | 41.7 | 0.04 |

Membrane Area = 150 m$^2$
Theoretical Horsepower = 427 + 93 hp
— = less than 0.01

Example 13

A computer calculation was performed to simulate the treatment of a typical overhead stream from the absorbers of a fluid catalytic cracker unit. The stream was assumed to have a flow rate of 5 MMscfd, and the following volume composition:

| | |
|---|---|
| Hydrogen | 20.0% |
| Methane | 15.0% |
| Ethane | 12.5% |
| Propane | 12.5% |
| n-Butane | 2.5% |
| n-Pentane | 2.5% |
| Ethylene | 10.0% |
| Propylene | 25.0% |

The treatment process was again assumed to be carried out according to the process design shown in FIG. 6, except that in this case, stream 612 is not recycled to the front of the process. In this example, unit 610 was assumed to be a ten-stage deethanizer.

The process produces three streams: a hydrogen-rich stream, stream 607, containing 52% hydrogen; a liquid olefin-rich stream, stream 611, containing 52% olefins; and a fuel gas stream, stream 612, containing 47% $C_1$–$C_2$ saturated hydrocarbons and essentially no $C_+$ hydrocarbons.

Example 14

A computer calculation was performed to model the process of the invention as carried out according to the embodiment shown in FIG. 5. This follows essentially the same series of steps as in FIG. 1, but in this case, heat integration is practiced. The membrane residue and permeate streams, and the flash tank overhead stream, are used to cool the incoming stream to the condensation step, which is carried out by means of a dephlegmator.

To model the performance of a dephlegmator, we performed calculations for six sequential condensation steps, at 2° C. increments from −10° C. to −20° C., assuming that the condensate from each step was returned as reflux to the sequentially higher temperature step.

The feed stream was assumed to have a flow rate of 20 MMscfd, and have the following volume composition:

| | |
|---|---|
| Hydrogen | 45.5% |
| Methane | 25% |
| Ethane | 14% |
| Propane | 10% |
| n-Butane | 3% |
| n-Pentane | 2.5% |

Membrane pressure-normalized fluxes were assumed to be as in Example 1. The results of the calculations are shown in Table 14. The stream numbers correspond to FIG. 5.

TABLE 14

| Component/<br>Parameter | Stream<br>503 | Stream<br>511 | Stream<br>507 | Stream<br>508 |
|---|---|---|---|---|
| Mass Flow Rate (lb/h) | 39,678 | 21,425 | 18,256 | 25,481 |
| Temperature (° C.) | 25 | −10 | −28 | −28 |
| Pressure (psia) | 50 | 450 | 450 | 50 |
| Component (mol %) | | | | |
| Hydrogen | 45.5 | 1.5 | 57.5 | 34.3 |
| Methane | 25.0 | 6.5 | 30.0 | 26.2 |
| Ethane | 14.0 | 27.2 | 10.4 | 27.8 |
| Propane | 10.0 | 39.3 | 2.0 | 11.0 |
| n-Butane | 3.0 | 13.9 | 0.03 | 0.7 |
| n-Pentane | 2.5 | 11.7 | — | — |

The process produces a hydrogen-enriched stream with a hydrogen content of 58%. Stream 511 is passed to the hydrocarbon fractionation step (not calculated in this example).

Example 15

For comparison, the calculation of Example 14 was repeated, this time assuming that the condensation step was instead carried out by chilling the incoming stream to −20° C. in a single external chiller. The results of the calculations are shown in Table 15.

TABLE 15

| Component/<br>Parameter | Feed<br>Stream | Condensate<br>Stream | Membrane<br>Residue | Membrane<br>Permeate |
|---|---|---|---|---|
| Mass Flow Rate (lb/h) | 39,678 | 21,786 | 17,889 | 16,731 |
| Temperature (° C.) | 25 | −20 | −26 | −26 |
| Pressure (psia) | 50 | 450 | 450 | 50 |
| Component (mol %) | | | | |
| Hydrogen | 45.5 | 1.5 | 58.0 | 36.8 |
| Methane | 25.0 | 7.3 | 30.0 | 27.3 |
| Ethane | 14.0 | 28.4 | 10.0 | 25.2 |
| Propane | 10.0 | 38.2 | 2.0 | 9.6 |
| n-Butane | 3.0 | 13.3 | 0.07 | 0.9 |
| n-Pentane | 2.5 | 11.3 | — | 0.2 |

— = less than 0.01

This process again produces a hydrogen-enriched stream containing 58% hydrogen.

Example 16

Calculations were performed to compare the chemical value and the fuel value of typical refinery or petrochemical fuel gas streams. Calculations were performed for three representative streams: low-pressure rich gas, low-pressure lean gas, and fluid catalytic cracker (FCC) off-gas. The fuel value was calculated assuming a natural gas cost of $2.00/MMBtu. Table 16 compares the chemical value of the components of such off-gas streams and the overall fuel value of the stream.

Depending on the gas stream, the difference between the fuel and chemical values of these streams is in the range $3.00 to $7.00/1,000 scf of gas. For FCC off-gas almost all of the extra chemical value lies in the $C_{2+}$ liquid fraction, particularly if ethylene and propylene can be valued at $0.15/lb. The $C_{3+}$ liquid fraction also provides most of the recovery value of the rich fuel gas, which contains 30% $C_{3+}$ hydrocarbons. For lean fuel gas, containing only 15% $C_{3+}$ hydrocarbons, the chemical value depends much more on the value of the hydrogen content. The value of separated hydrogen will depend a great deal on the purity and pressure of the gas and the needs of the refinery. However, as a rule of thumb, 400-psig gas containing more than 90% hydrogen can be valued at $5.00/1,000 scf—eight times the fuel value.

TABLE 16

| | Low-Pressure Rich Gas | | Low-Pressure Lean Gas | | FCC Off-Gas | |
|---|---|---|---|---|---|---|
| Component | Content<br>(vol %) | Value if<br>Separated<br>($/1,000 scf<br>mixed gas) | Content<br>(vol %) | Value if<br>Separated<br>($/1,000 scf<br>mixed gas) | Content<br>(vol %) | Value if<br>Separated<br>($/1,000 scf<br>mixed gas) |
| Hydrogen | 40 | 2.00 | 70 | 3.50 | 20 | 1.00 |
| Methane | 15 | 0.80 | 7.5 | 0.40 | 15 | 0.71 |
| Ethane | 15 | | 7.5 | | 12.5 | |
| Propane | 10 | 3.43 | 5 | 1.72 | 12.5 | 1.71 |
| Butane | 10 | | 5 | | 2.5 | |
| Pentane | 10 | | 5 | | 2.5 | |
| Ethylene | — | — | — | — | 10 | 6.60 |
| Propylene | — | | — | | 25 | |
| Total Chemical Value ($/1,000 scf) | | 6.23 | | 5.62 | | 10.02 |
| Total Fuel Value ($/1,000 scf) | | 2.95 | | 1.77 | | 3.27 |

We claim:

1. A process for treating an off-gas stream, containing at least hydrogen and a mixture of hydrocarbons, comprising the following steps:
   (a) cooling the off-gas stream to a temperature no lower than about −40° C., resulting in partial condensation of the off-gas stream, thereby dividing the off-gas stream into a condensed portion enriched in hydrocarbons and an uncondensed portion enriched in hydrogen;
   (b) passing the uncondensed portion as a feed stream to a membrane separation unit, the membrane separation unit containing a polymeric separation membrane, having a feed side and a permeate side, that is selective in favor of hydrocarbons over hydrogen;
   (c) withdrawing from the feed side a hydrogen-enriched product gas;
   (d) withdrawing from the permeate side a hydrocarbon-enriched stream;
   (e) passing the condensed portion to a hydrocarbon separation step for separation of a $C_{3+}$ hydrocarbon fraction and a lighter hydrocarbon fraction from the condensed portion.

2. The process of claim 1, wherein the temperature is no lower than about −20° C.

3. The process of claim 1, wherein the temperature is no lower than about 0° C.

4. The process of claim 1, wherein the off-gas stream is subjected to a compression step prior to the cooling step.

5. The process of claim 1, wherein the hydrocarbon-enriched stream is recirculated to the cooling step.

6. The process of claim 1, wherein the lighter hydrocarbon fraction is recirculated to the cooling step.

7. The process of claim 1, wherein the hydrocarbon-enriched stream is recirculated to the hydrocarbon separation step.

8. The process of claim 1, wherein the hydrocarbon separation step is carried out by flashing the condensed portion.

9. The process of claim 1, wherein the hydrocarbon separation step is carried out by distilling the condensed portion.

10. The process of claim 1, wherein the cooling step is carried out at least partially by passing the off-gas stream in heat-exchanging relationship against a stream selected from the group consisting of the hydrogen-enriched product stream, the hydrocarbon-enriched stream and the lighter hydrocarbon fraction.

11. The process of claim 1, wherein the cooling step is carried out in a dephlegmator.

12. The process of claim 1, wherein the hydrocarbon-enriched stream is passed to an additional treatment step for further separation of hydrogen from hydrocarbons.

13. The process of claim 12, wherein the additional treatment step comprises a membrane separation step.

14. The process of claim 12, wherein the additional separation step comprises an absorption step.

15. The process of claim 12, wherein the additional treatment step comprises compression and cooling.

16. The process of claim 1, wherein the hydrogen-enriched product gas is passed to an additional treatment step.

17. The process of claim 16, wherein the additional treatment step comprises a membrane separation step.

18. The process of claim 16, wherein the additional treatment step comprises an adsorption step.

19. The process of claim 16, wherein the additional treatment step comprises pressure swing adsorption.

20. The process of claim 1, wherein the separation membrane comprises silicone rubber.

21. The process of claim 1, wherein the separation membrane comprises a superglassy polymer.

22. The process of claim 1, wherein the off-gas stream is produced in a refinery operation.

23. The process of claim 1, wherein the off-gas stream is produced in a petrochemical plant operation.

24. The process of claim 1, wherein the off-gas stream is produced in a natural gas processing plant operation.

* * * * *